(12) United States Patent
Ly et al.

(10) Patent No.: US 10,389,467 B2
(45) Date of Patent: Aug. 20, 2019

(54) PHYSICAL CELL IDENTIFICATION CHANNEL (PCICH)

(71) Applicant: QUALCOMM Incorporated, San Diego, CA (US)

(72) Inventors: Hung Ly, San Diego, CA (US); Joseph Binamira Soriaga, San Diego, CA (US); Haitong Sun, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 15/588,464

(22) Filed: May 5, 2017

(65) Prior Publication Data

US 2018/0062781 A1    Mar. 1, 2018

Related U.S. Application Data

(60) Provisional application No. 62/380,329, filed on Aug. 26, 2016.

(51) Int. Cl.
| | |
|---|---|
| H04J 11/00 | (2006.01) |
| H04L 5/00 | (2006.01) |
| H04L 1/00 | (2006.01) |
| H04W 74/08 | (2009.01) |
| H04W 48/10 | (2009.01) |
| H04W 48/12 | (2009.01) |

(52) U.S. Cl.
CPC ....... *H04J 11/0079* (2013.01); *H04J 11/0073* (2013.01); *H04J 11/0076* (2013.01); *H04L 1/0041* (2013.01); *H04L 5/0053* (2013.01); *H04W 48/10* (2013.01); *H04W 48/12* (2013.01); *H04W 74/0833* (2013.01)

(58) Field of Classification Search
None
See application file for complete search history.

(56) References Cited

U.S. PATENT DOCUMENTS

| | | |
|---|---|---|
| 2009/0047955 A1 | 2/2009 | Frenger et al. |
| 2013/0039284 A1 | 2/2013 | Marinier et al. |
| | (Continued) | |

FOREIGN PATENT DOCUMENTS

| | | |
|---|---|---|
| WO | WO-2013122436 A1 | 8/2013 |

OTHER PUBLICATIONS

International Search Report and Written Opinion—PCT/US2017/047810—ISA/EPO—dated Oct. 27, 2017.

(Continued)

*Primary Examiner* — Candal Elpenord
(74) *Attorney, Agent, or Firm* — Loza & Loza, LLP

(57) ABSTRACT

Aspects of the present disclosure provide for the transmission of a cell identifier of a serving cell to a user equipment (UE). A Physical Cell Identification Channel (PCICH) is defined for carrying the cell identifier of the serving cell within an uplink-based mobility framework. In some examples, the PCICH may be transmitted in response to a trigger event that requires the user equipment to have knowledge of the cell identifier. For example, the UE may require the cell identifier to demodulate signals received from the serving cell and facilitate transmission and/or reception of user data traffic with the serving cell.

30 Claims, 15 Drawing Sheets

(56) References Cited

U.S. PATENT DOCUMENTS

| | | | |
|---|---|---|---|
| 2013/0301549 A1* | 11/2013 | Chen | H04W 4/90 370/329 |
| 2013/0301552 A1* | 11/2013 | Xu | H04W 48/12 370/329 |
| 2014/0056220 A1* | 2/2014 | Poitau | H04W 76/14 370/328 |
| 2014/0348093 A1 | 11/2014 | Ihm et al. | |
| 2015/0312817 A1 | 10/2015 | Huang et al. | |
| 2016/0234759 A1 | 8/2016 | Kubota et al. | |
| 2017/0374608 A1* | 12/2017 | Li | H04W 48/08 |

OTHER PUBLICATIONS

NEC: "LTE BCH-on-demand", R2-062930, TSG-RAN Working Group2#55, Oct. 5, 2006, XP002465836, Retrieved from the Internet: URL:http:/www.3gpp.org/ftp/tsg_ran/WG2_RL2/TSGR2_55/Documents/ [retrieved on Jan. 22, 2018], 5 pages.

Qualcomm Incorporated, "Uplink Based Mobility Physical Channels", 3GPP Draft, R1-166387, $3^{rd}$ Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 5 pages, XP051125354, Retrieved from the Internet: url:http://www.3gpp.org/ftp/Meetings3GPPSYNC/RAN1%20/Docs/ [retrieved on Aug. 21, 2016].

Samsung: "System Information Signalling Design in NR", 3GPP Draft; R2-163371 System Information Signaling Design in NR, 3rd Generation Partnership Project (3GPP), Mobile Competence Centre, 659, Route Des Lucioles, F-96921 Sophia-Antipolis Cedex, France, vol. RAN WG2, No. Nanjing, China, 29169523-29169527, May 13, 2016 (May 13, 2016), XP051095809, Retrieved from the Internet: URL: http://www.3gpp.org/ftp/tsg_ran/WG2_RL2/TSGR2_94/Docs/.

* cited by examiner

PHYSICAL CELL IDENTIFICATION CHANNEL (PCICH)

PRIORITY CLAIM

This application claims priority to and the benefit of Provisional Patent Application No. 62/380,329 filed in the U.S. Patent and Trademark Office on Aug. 26, 2016, the entire content of which is incorporated herein by reference as if fully set forth below in its entirety and for all applicable purposes

TECHNICAL FIELD

The technology discussed below relates generally to wireless communication systems, and more particularly, to network zones in next generation (5G) wireless networks. Embodiments can provide and enable techniques for identifying the serving cell within a network zone.

BACKGROUND

Mobility management within a wireless communication network is typically implemented using a downlink-based mobility framework in which downlink reference signals are utilized by a user equipment (UE) to select a serving cell to which the UE connects. For example, a UE may receive synchronization signals and system information broadcast by one or more cells and select a serving cell based on the signal strength of the broadcast signals. Once connected to the network through the serving cell, the UE may continue to monitor signals from the serving cell as well as other neighboring cells. If the UE moves from one cell to another, or if the signal quality of a neighboring cell exceeds that of the serving cell for a given amount of time, the UE may undertake a handoff or handover from the serving cell to the neighboring (target) cell. The above-described downlink-based mobility framework places a significant processing burden on the UE to search for neighboring cells, measure the signal strength from neighboring cells and identify a target cell for handover, especially in dense networks with numerous small cells or in high mobility deployments, such as high speed trains.

In next generation (e.g., 5G) wireless communication networks, an uplink-based mobility framework may be available in which uplink reference signals may be utilized by the network to select a serving cell for a UE. The uplink-based mobility framework reduces the amount of processing performed by the UE, hence leading to UE power savings. However, since the UE may be unaware of the cell selection process and may only have knowledge of a zone that the UE is located in, the identity of the serving cell may not be known by the UE.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the presence disclosure relate to transmission of a cell identifier of a serving cell to a user equipment (UE). A Physical Cell Identification Channel (PCICH) is defined for carrying the cell identifier of the serving cell within an uplink-based mobility framework. In some examples, the PCICH may be transmitted in response to a trigger event that requires the user equipment to have knowledge of the cell identifier. For example, the UE may require the cell identifier to demodulate signals received from the serving cell and facilitate transmission and/or reception of user data traffic with the serving cell.

In one aspect of the disclosure, a method of wireless communication in a wireless communication network is disclosed. The method includes transmitting a synchronization signal within a zone including a plurality of cells to enable a user equipment to synchronize with the zone. The method further includes communicating with the user equipment using a zone identifier of the zone without providing a cell identifier of a serving cell within the zone, and detecting a trigger event that necessitates the user equipment have knowledge of the cell identifier of the serving cell for communication between the user equipment and the serving cell within the zone. The method further includes transmitting a physical cell identification channel (PCICH) to the user equipment in response to the trigger event, where the PCICH includes at least the cell identifier of the serving cell.

Another aspect of the disclosure provides an apparatus in a wireless communication network. The apparatus includes a processor, a transceiver communicatively coupled to the processor, and a memory communicatively coupled to the processor. The processor is configured to transmit a synchronization signal within a zone including a plurality of cells to enable a user equipment to synchronize with the zone, and communicate with the user equipment using a zone identifier of the zone without providing a cell identifier of a serving cell within the zone. The processor is further configured to detect a trigger event that necessitates the user equipment to have knowledge of the cell identifier of the serving cell for communication between the user equipment and the serving cell within the zone, and transmit a physical cell identification channel (PCICH) to the user equipment in response to the trigger event, where the PCICH includes at least the cell identifier of the serving cell.

Examples of additional aspects of the disclosure follow. In some aspects of the disclosure, the PCICH may be transmitted within a downlink-centric slot including at least a downlink common and a downlink data portion. For example, the PCICH may be transmitted within one of the downlink data portion or the downlink common burst of the downlink-centric slot. In some aspects of the disclosure, the PCICH may be transmitted within an uplink-centric slot including at least a downlink common burst and an uplink data portion. For example, the PCICH may be transmitted within the downlink common burst. In some aspects of the disclosure, the PCICH may be transmitted over two or more slots. In some aspects of the disclosure, the PCICH may be repeated over one or more symbols of a slot or over one or more slots.

In some aspects of the disclosure, the method further includes dividing a downlink bandwidth into a plurality of sub-bands, transmitting the PCICH within a subset of the sub-band, and transmitting a signaling message indicating the subset of sub-bands including the PCICH. In some aspects of the disclosure, a cyclic redundancy check (CRC) code may be added to a payload of the PCICH. The payload, including the CRC code, may then be encoded to produce an encoded payload. In some aspects of the disclosure, the PCICH may be multiplexed with one or more additional PCICHs, where each of the additional PCICHs is associated with one or more respective additional user equipment.

In some aspects of the disclosure, the trigger event includes detecting the presence of user data traffic to be transmitted to the user equipment. In some examples, upon transmitting the PCICH, a paging message may be transmitted to the user equipment indicating the presence of user data traffic to be transmitted to the user equipment. In some aspects of the disclosure, the trigger event includes receiving a random access request from the user equipment indicating that the user equipment has user data traffic to transmit. In some examples, upon transmitting the PCICH, a random access response may be transmitted to the user equipment that is scrambled using the cell identifier. In some aspects of the disclosure, the trigger event includes receiving an on-demand system information request from the user equipment. In some examples, upon transmitting the PCICH, a system information response may be transmitted to the user equipment that is scrambled using the cell identifier.

In another aspect of the disclosure, another method of wireless communication in a wireless network is disclosed. The method includes receiving a synchronization signal within a zone including a plurality of cells, synchronizing with the zone utilizing the synchronization signal, and communicating with a serving cell within the zone using a zone identifier of the zone without receiving a cell identifier of the serving cell. Upon occurrence of a trigger event, the method further includes receiving a physical cell identification channel (PCICH) including at least the cell identifier of the serving cell within the zone, and communicating with the serving cell utilizing the cell identifier.

Another aspect of the disclosure provides another apparatus in a wireless communication network. The apparatus includes a processor, a transceiver communicatively coupled to the processor, and a memory communicatively coupled to the processor. The processor is configured to receive a synchronization signal within a zone including a plurality of cells, synchronize with the zone utilizing the synchronization signal, and communicate with a serving cell within the zone using a zone identifier of the zone without receiving a cell identifier of the serving cell. Upon occurrence of a trigger event, the processor is further configured to receive a physical cell identification channel (PCICH) comprising at least the cell identifier of the serving cell within the zone, and communicate with the serving cell utilizing the cell identifier.

Examples of additional aspects of the disclosure follow. In some aspects of the disclosure, the method further includes receiving a paging message indicating the presence of user data traffic to be transmitted, where the presence of user data traffic comprises the trigger event. The method further includes receiving a communication related to the user data traffic, and processing the communication utilizing the cell identifier.

In some aspects of the disclosure, the method further includes receiving a random access response signal in response to transmitting a random access request, where the random access request comprises the trigger event. The method further includes demodulating the random access response signal utilizing the cell identifier.

In some aspects of the disclosure, the method further includes receiving a system information response signal in response to transmitting an on-demand system information request, where the on-demand system information request comprises the trigger event, and demodulating the system information response signal utilizing the cell identifier. In some aspects of the disclosure, the method further includes receiving the PCICH within a subset of a plurality of sub-bands of a downlink bandwidth.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
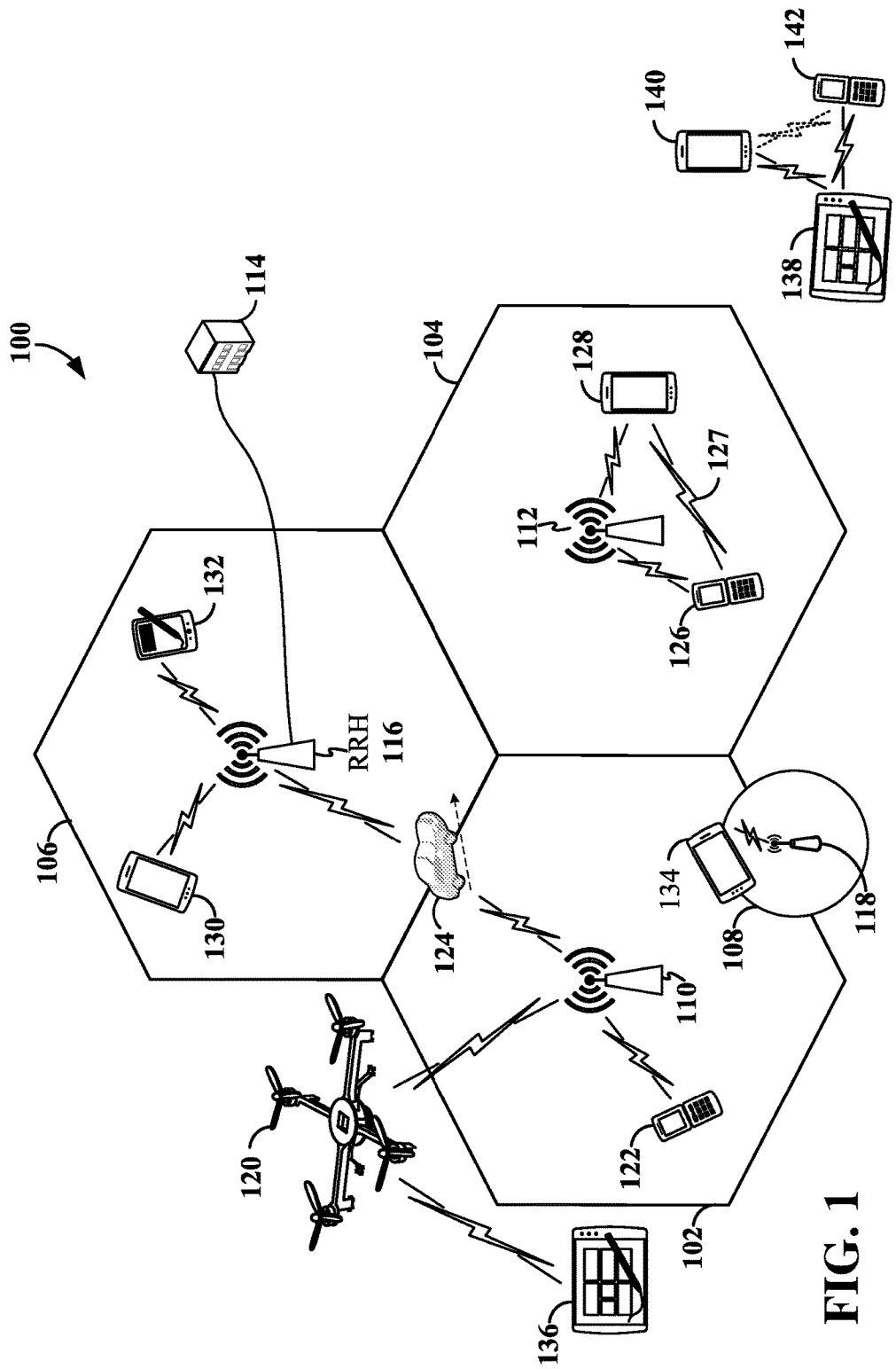
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a next generation (e.g., fifth generation (5G)) access network or a legacy (3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links.

This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 2:
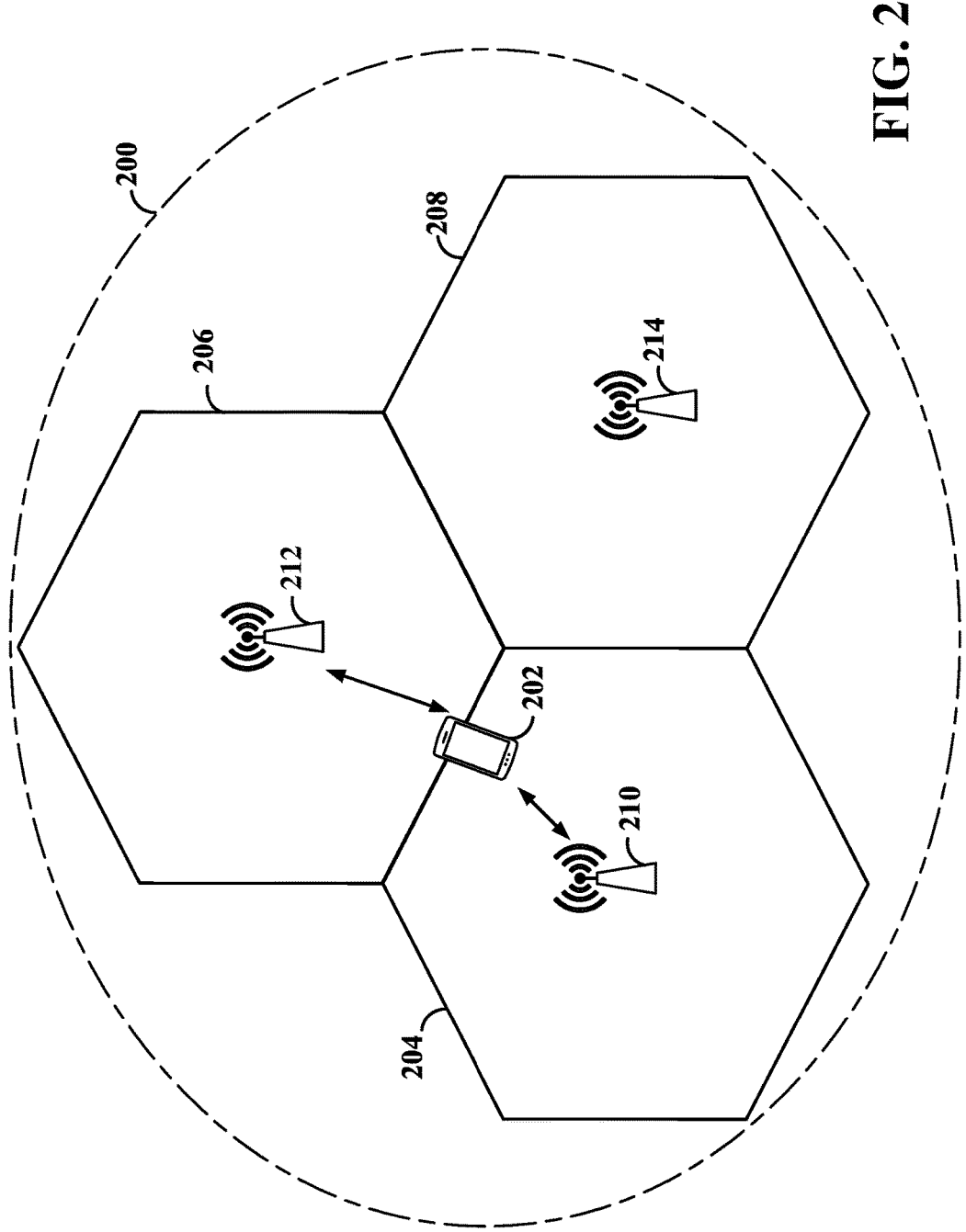
FIG. 2 is a diagram illustrating an example of a zone of cells according to some embodiments.

FIG. 2 is a diagram illustrating a network zone 200 including a plurality of cells 204, 206, and 208. Each of the cells 204, 206, and 208 is served by a respective base station 210, 212, and 214. The network zone 200 may be a zone associated with at least a portion of the access network 100 described in FIG. 1. As used herein, the term "zone" refers to a group or combination of cells that function in a coordinated manner and are highly synchronized. As a result of the coordinated operation of the cells in a zone, the synchronization signals are zone-specific. That is, the synchronization signals transmitted (e.g., broadcast) from the zone 200 are typically single-frequency network (SFN) synchronization signals. As further used herein, the term "single-frequency network" refers to a broadcast network where several transmitters simultaneously send the same signal over the same frequency channel.

In the example shown in FIG. 2, a UE 202 is located in an overlapping area or region between the network cells 204 and 206. Thus, the UE 202 in the overlapping area may receive unified synchronization signals from base stations 210 and 212. For example, base station 210 may generate and transmit (e.g., broadcast), unified synchronization signals, which may include a zone identifier for the network zone 200, as well as a nominal tone spacing being used by zone 200. Similarly, base station 212 may transmit (e.g., broadcast) the same unified synchronization signals that identify zone 200.

After receiving the unified synchronization signals, the UE 202 in the overlapping area may process the unified synchronization signals to synchronize with the zone 200 using the nominal tone spacing. The UE 202 may then transmit a pilot or reference signal, which may be concurrently received by base stations 210 and 212 within the zone 200. Each of the base stations 210 and 212 may measure a strength of the pilot signal, and the zone 200 (e.g., one or more of the base stations 210 and 212 and/or a central node within the core network (not shown)) may determine the serving cell for the UE 202. For example, the serving cell may be cell 206.

As described above, the unified synchronization signals may identify the zone, but may not identify the cell from which the signal is transmitted. There may be situations, however, where the UE 202 may require knowledge of the cell identifier of a serving cell. In some examples, the downlink channels (e.g., Physical Downlink Control Channel (PDCCH) and Physical Downlink Shared Channel (PDSCH)) utilized to carry control information and user data traffic to the UE 202 may be scrambled using the cell identifier of the serving cell 206. Thus, in accordance with various aspects of the present disclosure, in order to demodulate the PDCCH and PDSCH, the UE may be provided with the cell identifier of the serving cell 206 prior to receiving the PDCCH and/or PDSCH.

For example, when the UE 202 has user data traffic to transmit to the base station 210, the UE 202 may transmit a random access request to set up a connection with the base station 210. The base station 210 may then assign uplink resources to the UE 202 and transmit the uplink resource assignment information to the UE 202 on the PDCCH. The base station 210 may further transmit a random access response to the UE 202 on the PDSCH. Similarly, when the base station 210 has user data traffic to be transmitted to the UE 202, the base station 210 may page the UE 202 using, for example, a Keep Alive message. Upon receiving a response from the UE 202, the base station 210 may allocate downlink resources to the UE 202 for the downlink user data traffic transmission and transmit the allocated downlink resource information to the UE 202 on the PDCCH. The downlink user data traffic may then be transmitted by the base station 210 on the PDSCH.

In addition, in 5G networks, system information may be transmitted to UEs 202 on-demand (e.g., in response to a UE 202 transmitting a system information request), thus enabling the network to forego broadcasting the system information and enabling the network to conserve power. For example, the UE 202 may transmit a system information request, and in response, the base station 210 may transmit a system information response, such as a Master Information Block (MIB) and/or one or more System Information Blocks (SIBs), on the PDSCH.

To enable the UE 202 to decode the PDCCH and PDSCH, the base station 210 may transmit the cell identifier of the serving cell 206 to the UE 202 prior to transmitting the PDCCH and/or PDSCH. In accordance with various aspects of the present disclosure, the cell identifier may be transmitted on a new channel, referred to herein as the Physical Cell Identification Channel (PCICH). In some examples, the PCICH may transmitted based on the occurrence of a trigger event detected at the base station 210. By way of example, but not limitation, as described above, the trigger event may include reception of a random access request from the UE 202, reception of user data traffic to be transmitted to the UE 202 and/or reception of a system information request from the UE 202.

Figure 3:
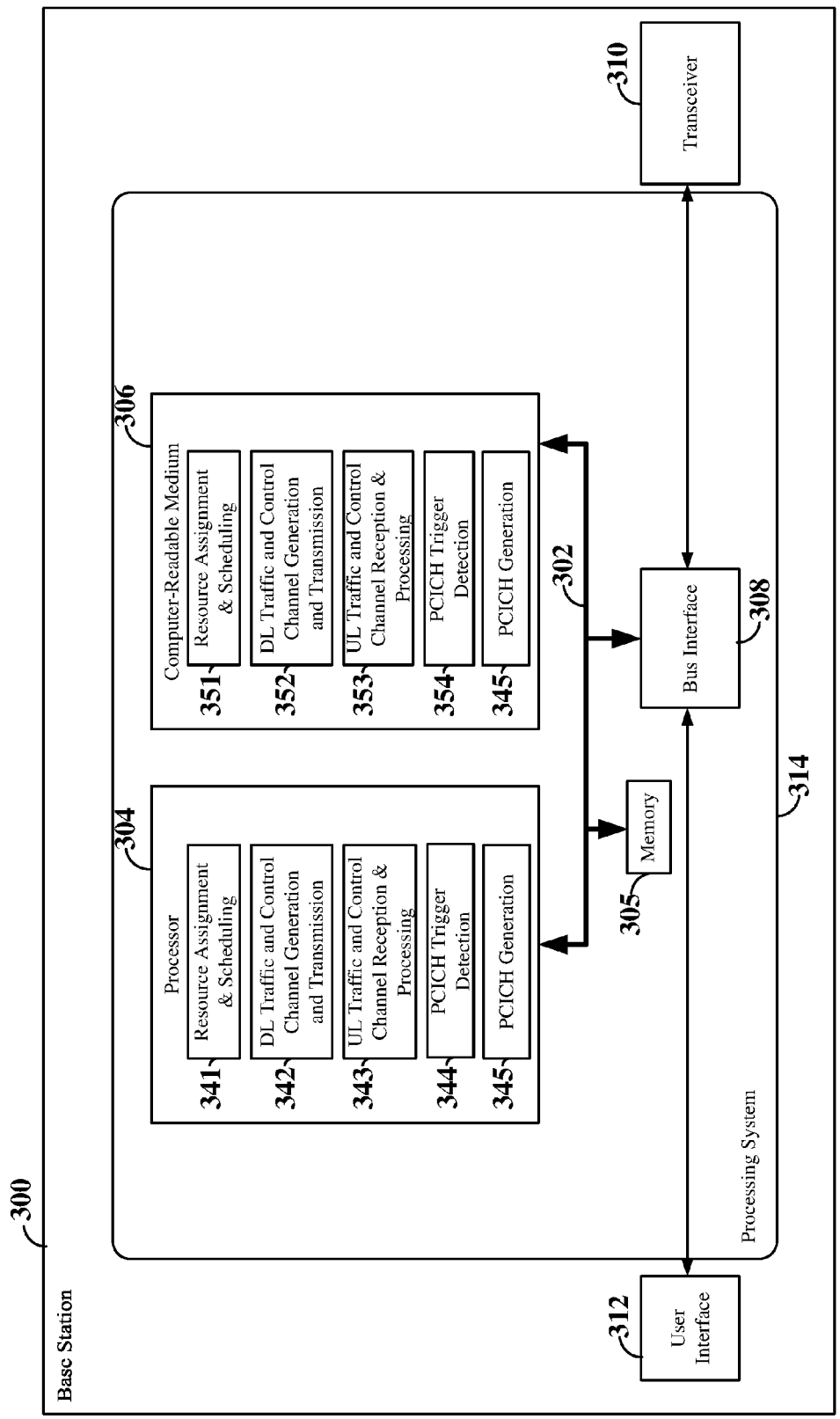
FIG. 3 is a block diagram illustrating an example of a hardware implementation for a base station employing a processing system according to some embodiments.

FIG. 3 is a conceptual diagram illustrating an example of a hardware implementation for an exemplary base station 300 employing a processing system 314. For example, the base station 300 may be a next generation (5G) base station as illustrated in any one or more of FIGS. 1 and 2.

The base station 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 300 may be configured to perform any one or more of the functions described herein. That is, the processor 304, as utilized in a base station 300, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium (e.g., air interface). Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include resource assignment and scheduling circuitry 341, configured to generate, schedule, and modify a resource assignment or grant of time-frequency resources. For example, the resource assignment and scheduling circuitry 341 may schedule time-frequency resources within a plurality of time division duplex (TDD) and/or frequency division duplex (FDD) subframes or slots to carry user data traffic and/or control information to and/or from multiple UEs. The resource assignment and scheduling circuitry 341 may further operate in coordination with resource assignment and scheduling software 351.

The processor 304 may further include downlink (DL) traffic and control channel generation and transmission circuitry 342, configured to generate and transmit downlink traffic and control channels within one or more subframes or slots. The DL traffic and control channel generation and transmission circuitry 342 may operate in coordination with the resource assignment and scheduling circuitry 341 to place the DL user data traffic and/or control information onto a time division duplex (TDD) or frequency division duplex (FDD) carrier by including the DL user data traffic and/or control information within one or more subframes or slots in accordance with the resources assigned to the DL user data traffic and/or control information.

For example, the DL traffic and control channel generation and transmission circuitry 342 may be configured to generate a Keep Alive message (e.g., paging message) for a particular UE to indicate the base station has user data traffic to be transmitted to the UE. The DL traffic and control channel generation and transmission circuitry 342 may further be configured to generate a communication related to the user data traffic to be transmitted. For example, the DL traffic and control channel generation and transmission circuitry 342 may be configured to generate a physical downlink control channel (PDCCH) (or Enhanced PDCCH (ePDCCH)) including downlink control information (DCI). In some examples, the DCI may include an assignment of downlink resources for the user data traffic. In addition, the DL traffic and control channel generation and transmission circuitry 342 may further be configured to generate a physical downlink shared channel (PDSCH) (or Enhanced PDSCH (ePDSCH)) including the downlink user data traffic.

The PDCCH may also include, for example, control information indicating a grant of uplink resources for a particular UE in response to receiving a random access request. The PDSCH may also include, for example, a random access response to the random access request received from a particular UE. The PDSCH may further include, for example, a Master Information Block (MIB) and/or one or more System Information Blocks (SIBs) in response to an on-demand system information request from a particular UE. In some examples, the DL traffic and control channel generation and transmission circuitry 342 may further scramble the PDCCH and/or PDSCH with the cell identifier of the cell served by the base station 300. The DL traffic and control channel generation and transmission circuitry 342 may further operate in coordination with DL traffic and control channel generation and transmission software 352.

The processor 304 may further include uplink (UL) traffic and control channel reception and processing circuitry 343, configured to receive and process uplink control channels and uplink traffic channels from one or more UEs. For example, the UL traffic and control channel reception and processing circuitry 343 may be configured to receive random access requests from one or more UEs, where the random access requests are configured to request a grant of time-frequency resources for uplink user data transmissions. The UL traffic and control channel reception and processing circuitry 343 may further be configured to receive on-demand system information requests from one or more UEs. In some examples, a random access request and/or an on-demand system information request may be received in an uplink chirp message from a particular UE. The chirp message may include, for example, a chirp purpose indicator to identify a purpose or functionality of the chirp message. For example, the chirp purpose indicator may indicate that the chirp message is related to one of requesting system information, initiating a random access procedure or other purpose.

In general, the UL traffic and control channel reception and processing circuitry 343 may operate in coordination with the resource assignment and scheduling circuitry 341 to schedule UL user data traffic transmissions, DL user data traffic transmissions and/or DL user data traffic retransmissions in accordance with the received UL information. The UL traffic and control channel reception and processing circuitry 343 may further operate in coordination with UL traffic and control channel reception and processing software 353.

The processor 304 may further include PCICH trigger detection circuitry 344, configured to detect the occurrence of a trigger event for generating and transmitting the PCICH including the cell identifier of the cell served by the base station 300 to one or more UEs. In some examples, the trigger event may include detecting the presence of user data traffic to be transmitted to a UE and/or transmitting a paging message (e.g., a Keep Alive message) to the UE indicating the presence of user data traffic to be transmitted to the UE. In other examples, the trigger event may include receiving a random access request from a UE indicating that the UE has user data traffic to transmit to the base station 300. In still other examples, the trigger event may include receiving an on-demand system information request from a UE. The PCICH trigger detection circuitry 344 may further operate in coordination with PCICH trigger detection software 354.

The processor 304 may further include PCICH generation circuitry 345, configured to generate the PCICH for one or more UEs in response to the PCICH trigger detection circuitry 344 detecting the occurrence of a trigger event. In some examples, upon detecting a trigger event, the PCICH trigger detection circuitry 344 may request resources for the PCICH from the resource assignment and scheduling circuitry 341 and instruct the PCICH generation circuitry 345 to generate the PCICH for a particular UE (e.g., a unicast PCICH). The PCICH generation circuitry 345 may then generate the PCICH including the cell identifier of the serving cell and provide the PCICH to the DL traffic and control channel generation and transmission circuitry 342 to place the PCICH within one or more subframes or slots in accordance with the resources assigned to the PCICH. In some examples, the PCICH may be self-contained within a single subframe or slot. In other examples, the PCICH may be transmitted across two or more subframes or slots.

In some examples, the assigned resources for the PCICH may include one or more sub-bands within a downlink bandwidth utilized for transmission of a subframe or slot. For example, the downlink bandwidth may be divided into a plurality of sub-bands, where each sub-band includes a set of contiguous time-frequency resources. The PCICH may be transmitted over all of the sub-bands or only a subset of the sub-bands.

In some examples, a UE may have access to only part of the system downlink bandwidth due to hardware constraints and/or power savings requirements of the UE. For example, if the downlink bandwidth is 100 MHz, and the UE only has the capability to access 20 MHz, the UE may signal the UE bandwidth constraints to the base station 300. The PCICH may then be transmitted within a subset of the sub-bands that spans a bandwidth less than or equal to the 20 MHz bandwidth of the UE.

In some examples, the PCICH may be separately transmitted within each sub-band to ensure that each UE may be able to receive the PCICH regardless of the UE constraints. In other examples, the PCICH may be transmitted within one or more pre-configured sub-bands of the downlink bandwidth. In addition, the Keep Alive message (e.g., paging message) transmitted by the DL traffic and control channel generation and transmission circuitry 342 may further be transmitted within one or more pre-configured sub-bands of the downlink bandwidth.

The PCICH may further be repeated or retransmitted over one or more subframes or slots and/or one or more symbols of the same subframe or slot. For example, the PCICH may be initially transmitted within a first subframe or slot and then repeated within at least a second subframe or slot. Similarly, the PCICH may be initially transmitted within a first symbol of a first subframe or slot and then repeated within at least a second symbol of the first subframe or slot. The number of repeated transmissions may be pre-configured or may be determined based on acknowledgement information received from the UE.

In some examples, the PCICH generation circuitry 345 may generate a respective PCICH for each of a plurality of UEs and provide the generated PCICHs to the DL traffic and control channel generation and transmission circuitry 342. The DL traffic and control channel generation and transmission circuitry 342 may then multiplex each of the PCICHs using, for example, code division multiplexing, frequency division multiplexing, time division multiplexing, or a hybrid thereof.

The PCICH generation circuitry 345 may further be configured to add a cyclic redundancy check (CRC) code to a payload of the PCICH and then encode the payload including the CRC code to produce an encoded payload. For example, the PCICH payload may be encoded using, for example, convolutional coding, turbo coding, polar coding, etc. The specific configuration, pre-configured number and/or location of retransmissions, and/or pre-configured sub-bands for transmission of the PCICH may be signaled, for example, within system information (e.g., MIB and/or SIB) to the UE.

In some examples, the PCICH numerology may be nominal (e.g., use the same numerology as other control and/or traffic channels). For example, the PCICH may include the same subcarrier spacing, cyclic prefix, symbol duration, Fast Fourier Transform (FFT) size, etc.

In examples in which the PCICH is unicast to the UE, the PCICH may further be scrambled using the identity of the UE (UE-ID). In some examples, both a Downlink Modulation Reference Signal (DMRS) utilized by the UE to demodulate the PCICH and the PCICH may be scrambled by the UE-ID. The PCICH generation circuitry 345 may further operate in coordination with PCICH generation software 355.

Figure 4:
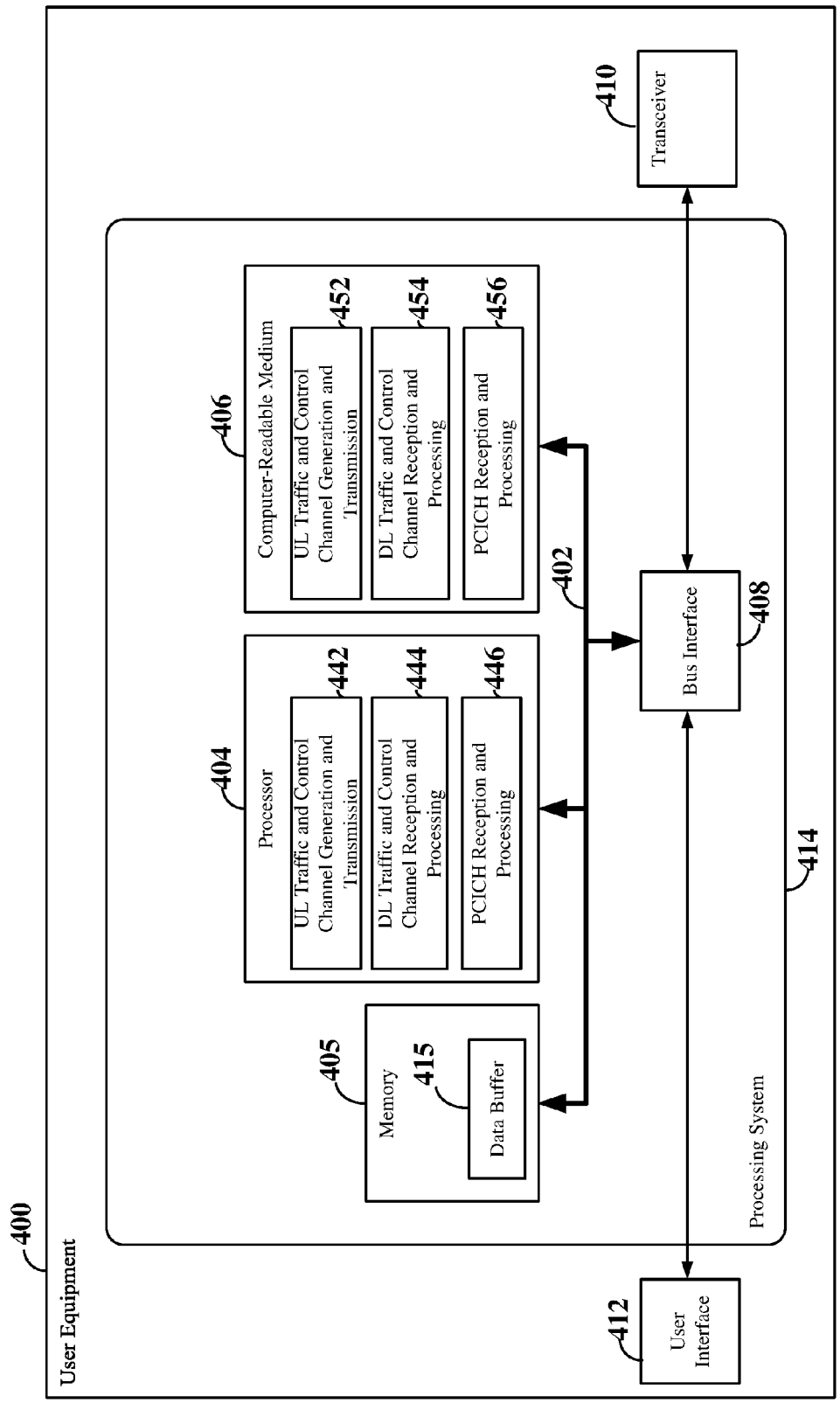
FIG. 4 is a diagram illustrating an example of a hardware implementation for a user equipment (UE) employing a processing system according to some embodiments.

FIG. 4 is a conceptual diagram illustrating an example of a hardware implementation for an exemplary UE 400 employing a processing system 414. For example, the UE 400 may be a UE as illustrated in any one or more of FIGS. 1 and 2.

The processing system 414 may be substantially the same as the processing system 314 illustrated in FIG. 3, including a bus interface 408, a bus 402, memory 405, a processor 404, and a computer-readable medium 406. Furthermore, the UE 400 may include a user interface 412 and a transceiver 410 substantially similar to those described above in FIG. 3. That is, the processor 404, as utilized in a UE 400, may be used to implement any one or more of the processes described below.

In some aspects of the disclosure, the processor 404 may include uplink (UL) traffic and control channel generation and transmission circuitry 442, configured to generate and transmit uplink user data traffic on an UL traffic channel, and to generate and transmit uplink control/feedback/acknowledgement information on an UL control channel. For example, the UL traffic and control channel generation and transmission circuitry 442 may be configured to generate and transmit random access request indicating the UE 400 has uplink user data traffic to transmit. In another example, the UL traffic and control channel generation and transmission circuitry 442 may be configured to generate and transmit an on-demand system information request. In some examples, the UL traffic and control channel generation and transmission circuitry 442 may be configured to generate a chirp message including the random access request or the system information request. The UL traffic and control channel generation and transmission circuitry 442 may further be configured to generate a pilot (or reference) signal to enable the network to select a serving cell/base station for the UE. The UL traffic and control channel generation and transmission circuitry 442 may operate in coordination with UL traffic and control channel generation and transmission software 452.

The processor 404 may further include downlink (DL) traffic and control channel reception and processing circuitry 444, configured for receiving and processing downlink user data traffic on a traffic channel, and to receive and process control information on one or more downlink control channels. For example, the DL traffic and control channel reception and processing circuitry 444 may be configured to receive downlink control information (DCI) indicating an assignment of downlink resources or a grant of uplink resources within a PDCCH, system information or a random access response within a PDSCH and downlink user data traffic within a PDSCH. The DL traffic and control channel reception and processing circuitry 444 may further be configured to receive a Downlink Modulation Reference Signal (DMRS), which may be scrambled with the UE-ID. In some examples, the received downlink user data traffic and/or control information may be temporarily stored in a data buffer 415 within memory 405. The DL traffic and control channel reception and processing circuitry 444 may be further configured to receive unified synchronization signals from a zone of cells and process the unified synchronization signals to synchronize with the zone. The DL traffic and control channel reception and processing circuitry 444 may operate in coordination with DL traffic and control channel reception and processing software 454.

The processor 404 may further include PCICH reception and processing circuitry 446, configured to receive a PCICH including a cell identifier of the serving cell. In some examples, the PCICH may be self-contained within a single subframe or slot. In other examples, the PCICH may be transmitted across two or more subframes or slots.

The PCICH reception and processing circuitry 446 may further be configured to decode the PCICH (e.g., based on the received DMRS) to obtain the cell identifier and provide the cell identifier to the DL traffic and control channel reception and processing circuitry 444. The DL traffic and control channel reception and processing circuitry may then utilize the cell identifier to demodulate various signals, such as PDCCH and/or PDSCH signals, received from the serving cell. For example, the DL traffic and control channel reception and processing circuitry 444 may be configured to demodulate a PDSCH carrying a system information response or a random access response from the serving cell utilizing the cell identifier. In another example, the DL traffic and control channel reception and processing circuitry 444 may be configured to demodulate a PDCCH carrying downlink control information (DCI) indicating an assignment of downlink resources for downlink user data traffic and a PDSCH containing the downlink user data traffic from the serving cell utilizing the cell identifier. Similarly, the DL traffic and control channel reception and processing circuitry 444 may be configured to demodulate a PDCCH carrying a grant of uplink resources for the UE 400 to transmit uplink user data traffic utilizing the cell identifier.

The PCICH reception and processing circuitry 446 may further be configured to monitor one or more sub-bands of the system downlink bandwidth for the PCICH. In addition, the PCICH reception and processing circuitry 446 may be configured to monitor at least one of the sub-bands over a listening window to increase the likelihood that the UE 202 will correctly receive the PCICH (e.g., the initial PCICH and/or one or more repeated/retransmitted PCICHs). The PCICH reception and processing circuitry 446 may further be configured to decode the PCICH based on the type of coding utilized (e.g., convolutional coding, turbo coding, polar coding, etc.) and process an attached CRC code to ensure the PCICH is correctly received. The PCICH reception and processing circuitry 446 may further operate in coordination with PCICH reception and processing software 456.

Figure 5:
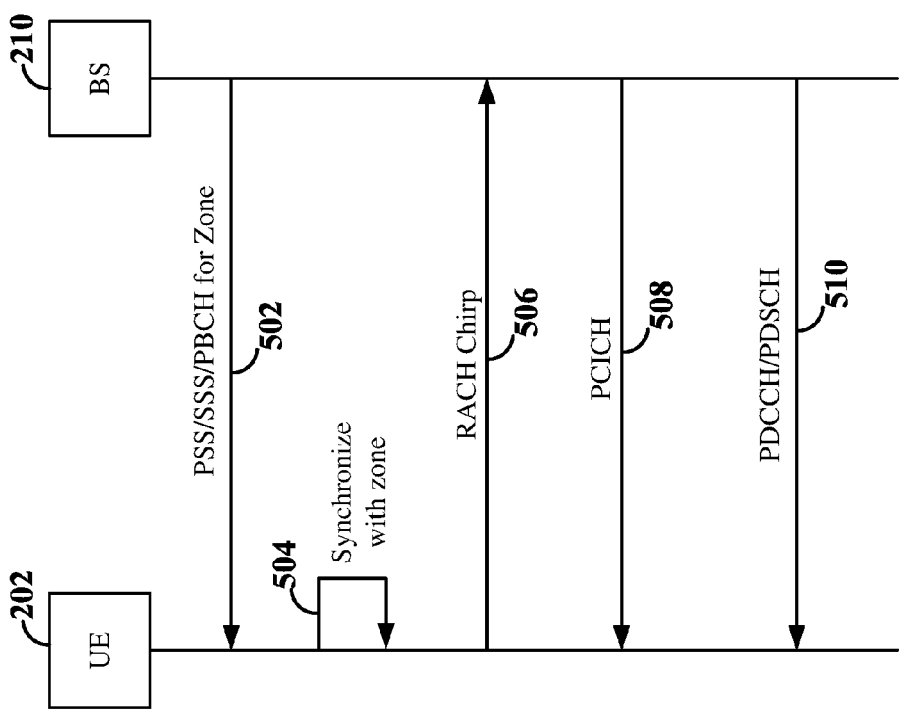
FIG. 5 is a signaling diagram illustrating exemplary signaling for performing a random access procedure with a serving base station according to some embodiments.

FIG. 5 is a signaling diagram illustrating exemplary signaling for a UE 202 to perform a random access procedure with a serving base station (BS) 210 according to some embodiments. The UE 202 may correspond, for example, to any of the UEs illustrated in FIGS. 1, 2, and/or 4. The BS 210 may correspond, for example, to any of the base stations illustrated in FIGS. 1, 2, and/or 3.

In the example, shown in FIG. 5, at 502, the UE 202 may first receive unified synchronization signals of a zone from the BS 210. For example, upon powering on, the UE 202 may listen to synchronization and/or broadcast channels to obtain the synchronization information necessary for initial access to the zone. Examples of synchronization information include, but are not limited to, one or more of downlink system bandwidth/carrier frequency, a Physical Hybrid ARQ Indicator Channel structure, the most significant eight-bits of the System Frame Number, a master information block (MIB), etc. In some examples, the synchronization and/or broadcast channels may include the Primary Synchronization Signal (PSS), the Secondary Synchronization Signal (SSS), and/or the Physical Broadcast Channel (PBCH).

Upon receiving the unified synchronization signals from the BS 210, at 504, the UE 202 may acquire timing of the zone and synchronize with the zone. At 506, when the UE 202 detects the presence of user data traffic to be transmitted to the BS 210, the UE 202 may transmit a random access request. For example, the UE 202 may generate and transmit a chirp signal including a random access chirp purpose indicator to request uplink resources to transmit the user data traffic.

Upon receiving the random access request, at 508, the BS 210 triggers the generation and transmission of the PCICH to the UE 202. The PCICH includes the cell identifier of the cell served by the BS 210. At 510, the BS 210 may transmit a PDCCH including a grant of uplink resources for transmission of the user data traffic and a PDSCH including a random access response. In some examples, the PDCCH and/or PDSCH (e.g., the random access response) may be scrambled using the cell identifier. The UE 202 may utilize the cell identifier obtained from the PCICH to demodulate the PDCCH and PDSCH.

Figure 6:
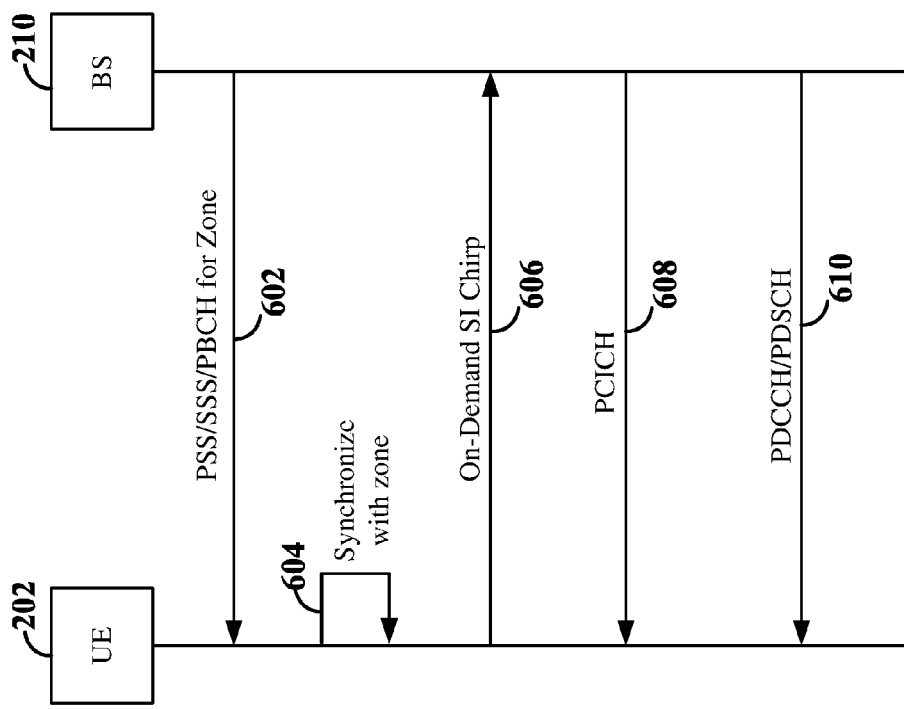
FIG. 6 is a signaling diagram illustrating exemplary signaling for receiving on-demand system information from a serving base station according to some embodiments.

FIG. 6 is a signaling diagram illustrating exemplary signaling for a UE 202 to receive on-demand system information from a serving base station 210 according to some embodiments. The UE 202 may correspond, for example, to any of the UEs illustrated in FIGS. 1, 2, and/or 4. The BS 210 may correspond, for example, to any of the base stations illustrated in FIGS. 1, 2, and/or 3.

In the example, shown in FIG. 6, at 602, the UE 202 may first receive unified synchronization signals of a zone from the BS 210. For example, upon powering on, the UE 202 may listen to synchronization and/or broadcast channels to obtain the synchronization information necessary for initial access to the zone. Examples of synchronization information include, but are not limited to, one or more of downlink system bandwidth/carrier frequency, a Physical Hybrid ARQ Indicator Channel structure, the most significant eight-bits of the System Frame Number, a master information block (MIB), etc. In some examples, the synchronization and/or broadcast channels may include the Primary Synchronization Signal (PSS), the Secondary Synchronization Signal (SSS), and/or the Physical Broadcast Channel (PBCH).

Upon receiving the unified synchronization signals from the BS 210, at 604, the UE 202 may acquire timing of the zone and synchronize with the zone. At 606, the UE 202 may transmit a system information request to the BS 210 to request, for example, a MIB and/or one or more SIBs. In some examples, the UE 202 may transmit a chirp signal including a system information chirp purpose indicator to request the MIB and/or SIBs from the BS 210.

Upon receiving the system request, at 608, the BS 210 triggers the generation and transmission of the PCICH to the UE 202. The PCICH includes the cell identifier of the cell served by the BS 210. At 610, the BS 210 may transmit a PDCCH and/or PDSCH including a system information response (e.g., the requested MIB and/or SIB s). In some examples, the PDCCH and/or PDSCH (e.g., the system information response) may be scrambled using the cell identifier. The UE 202 may utilize the cell identifier obtained from the PCICH to demodulate the PDCCH and/or PDSCH.

Figure 7:
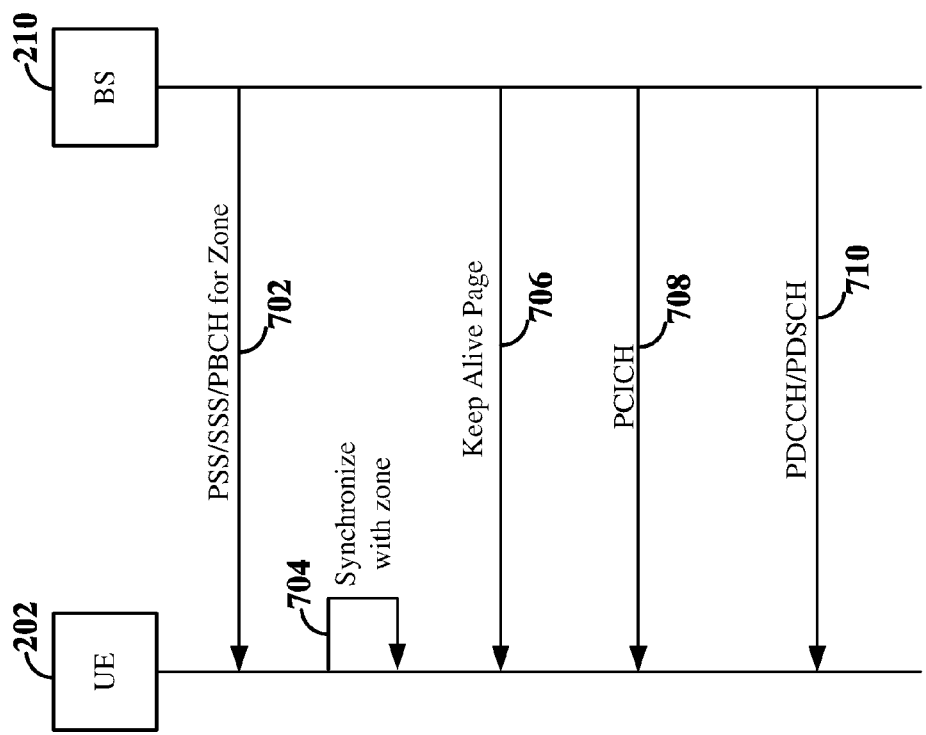
FIG. 7 is a signaling diagram illustrating exemplary signaling for paging and transmitting user data traffic to a UE from a serving base station according to some embodiments.

FIG. 7 is a signaling diagram illustrating exemplary signaling for a base station (BS) 210 to page and transmit user data traffic to a UE 202 according to some embodiments. The UE 202 may correspond, for example, to any of the UEs illustrated in FIGS. 1, 2, and/or 4. The BS 210 may correspond, for example, to any of the base stations illustrated in FIGS. 1, 2, and/or 3.

In the example, shown in FIG. 7, at 702, the UE 202 may first receive unified synchronization signals of a zone from the BS 210. For example, upon powering on, the UE 202 may listen to synchronization and/or broadcast channels to obtain the synchronization information necessary for initial access to the zone. Examples of synchronization information include, but are not limited to, one or more of downlink system bandwidth/carrier frequency, a Physical Hybrid ARQ Indicator Channel structure, the most significant eight-bits of the System Frame Number, a master information block (MIB), etc. In some examples, the synchronization and/or broadcast channels may include the Primary Synchronization Signal (PSS), the Secondary Synchronization Signal (SSS), and/or the Physical Broadcast Channel (PBCH).

Upon receiving the unified synchronization signals from the BS 210, at 704, the UE 202 may acquire timing of the zone and synchronize with the zone. At 706, the BS 210 may detect the presence of downlink user data traffic to be transmitted to the UE 202 and transmit a Keep Alive (e.g., paging) message to the UE indicating the presence of the downlink user data traffic. Upon detecting the downlink user data traffic and transmitting the Keep Alive page message, at 708, the BS 210 triggers the generation and transmission of the PCICH to the UE 202. The PCICH includes the cell identifier of the cell served by the BS 210. At 710, the BS 210 may transmit a PDCCH including an assignment of resources for the downlink user data traffic and a PDSCH including the downlink user data traffic. The UE 202 may utilize the cell identifier obtained from the PCICH to demodulate the PDCCH and PDSCH.

Figure 8:
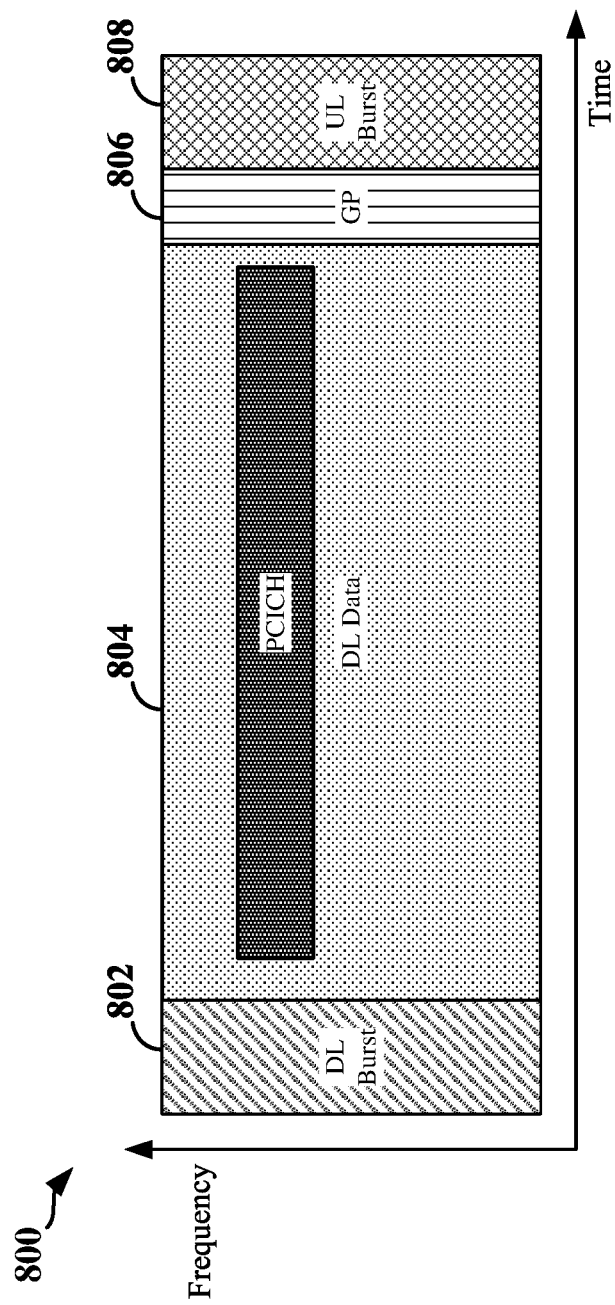
FIG. 8 illustrates a structure of a downlink-centric slot including a Physical Cell Identification Channel (PCICH) according to some embodiments.

FIG. 8 illustrates a structure of a downlink-centric (DL-centric) slot 800 including a Physical Cell Identification Channel (PCICH) 810 according to some embodiments. The DL-centric slot is referred to as a DL-centric slot because a majority (or, in some examples, a substantial portion) of the slot includes DL user data traffic. In the example shown in FIG. 8, time is illustrated along a horizontal axis, while frequency is illustrated along a vertical axis. The time-frequency resources of the DL-centric slot 500 may be divided into a DL common burst 802, a DL data portion 804 and an UL common burst 808.

The DL common burst 802 may exist in the initial or beginning portion of the DL-centric slot. The DL common burst 802 may include any suitable DL information in one or more channels. In some examples, the DL common burst 802 may include various scheduling information and/or control information corresponding to various portions of the DL-centric slot. In some configurations, the DL common burst 802 may be a physical DL control channel (PDCCH). The DL-centric slot may also include a DL data portion 804. The DL data portion 804 may sometimes be referred to as the payload of the DL-centric slot. The DL data portion 804 may include the communication resources utilized to communicate DL user data traffic from the base station to the UE. In some configurations, the DL data portion 804 may be a physical DL shared channel (PDSCH).

The UL common burst 808 may include any suitable UL information in one or more channels. In some examples, the UL common burst 808 may include feedback information corresponding to various other portions of the DL-centric slot. For example, the UL common burst 808 may include feedback information corresponding to the DL common burst 802 and/or DL data portion 804. Non-limiting examples of feedback information may include an ACK signal, a NACK signal, a HARQ indicator, and/or various other suitable types of information. The UL common burst 808 may include additional or alternative information, such as information pertaining to random access channel (RACH) procedures, scheduling requests (SRs), and various other suitable types of information.

As illustrated in FIG. 8, the end of the DL data portion 804 may be separated in time from the beginning of the UL common burst 808. This time separation may sometimes be referred to as a gap, a guard period, a guard interval, and/or various other suitable terms, hereinafter referred to as a guard period (GP) 806. This separation provides time for the switch-over from DL communication (e.g., reception operation by the UE to UL communication (e.g., transmission by the UE). One of ordinary skill in the art will understand that the foregoing is merely one example of a DL-centric slot and alternative structures having similar features may exist without necessarily deviating from the aspects described herein.

In accordance with various aspects of the present disclosure, the DL data portion 804 may further be used to transmit the PCICH 810. While the illustration in FIG. 8 provides the PCICH 810 as a contiguous block extending across most or all of the DL data portion 804 in the time dimension, it is to be understood that this is not necessarily the case, and any suitable number of PCICH transmissions may be included in the DL data portion 804. For example, the PCICH may be transmitted within one symbol of the DL data portion 804, and then may be repeated within one or more additional symbols of the DL data portion 804.

In some examples, the PCICH may be transmitted within only a portion of the downlink bandwidth (frequencies) of the slot. For example, the PCICH may be transmitted within a subset of a plurality of sub-bands spanning the downlink bandwidth in the frequency domain. In other examples, the PCICH may be transmitted across all sub-bands of the downlink bandwidth. In some examples, the PCICH may be separately transmitted within each sub-band to ensure that each UE may be able to receive the PCICH regardless of the UE constraints.

Figure 9:
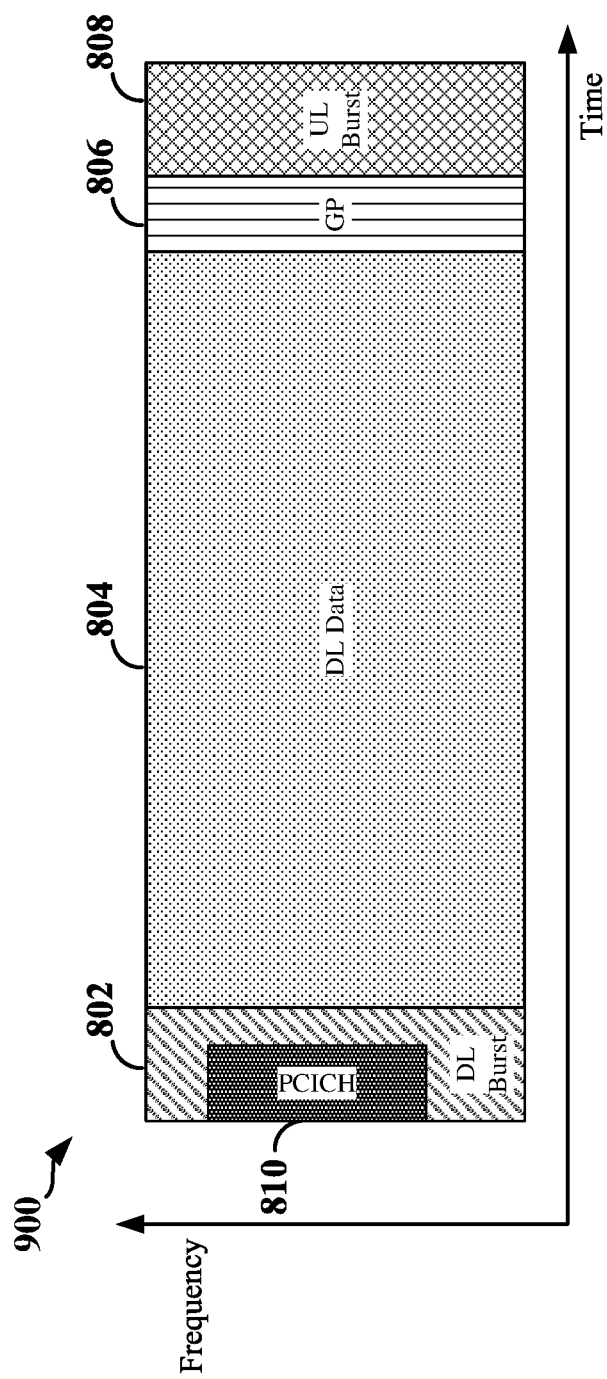
FIG. 9 illustrates another structure of a downlink-centric slot including the PCICH according to some embodiments.

FIG. 9 illustrates another structure of a downlink-centric (DL-centric) slot 900 including the PCICH 810 according to some embodiments. In the DL-centric slot 900 shown in FIG. 9, the structure again includes the DL common burst 802, DL data portion 804, GP 806 and UL common burst 808. However, instead of including the PCICH in the DL data portion 804, the PCICH 810 may be included in the DL common burst 802. In some examples, the PCICH may be transmitted within one or more symbols of the DL common burst 802, and then may be repeated within one or more additional symbols of the DL common burst 802 and/or one or more additional symbols of the DL data portion 804. In addition, the PCICH may be transmitted across all of the sub-bands of the downlink bandwidth or within a subset of a plurality of sub-bands of the downlink bandwidth.

Figure 10:
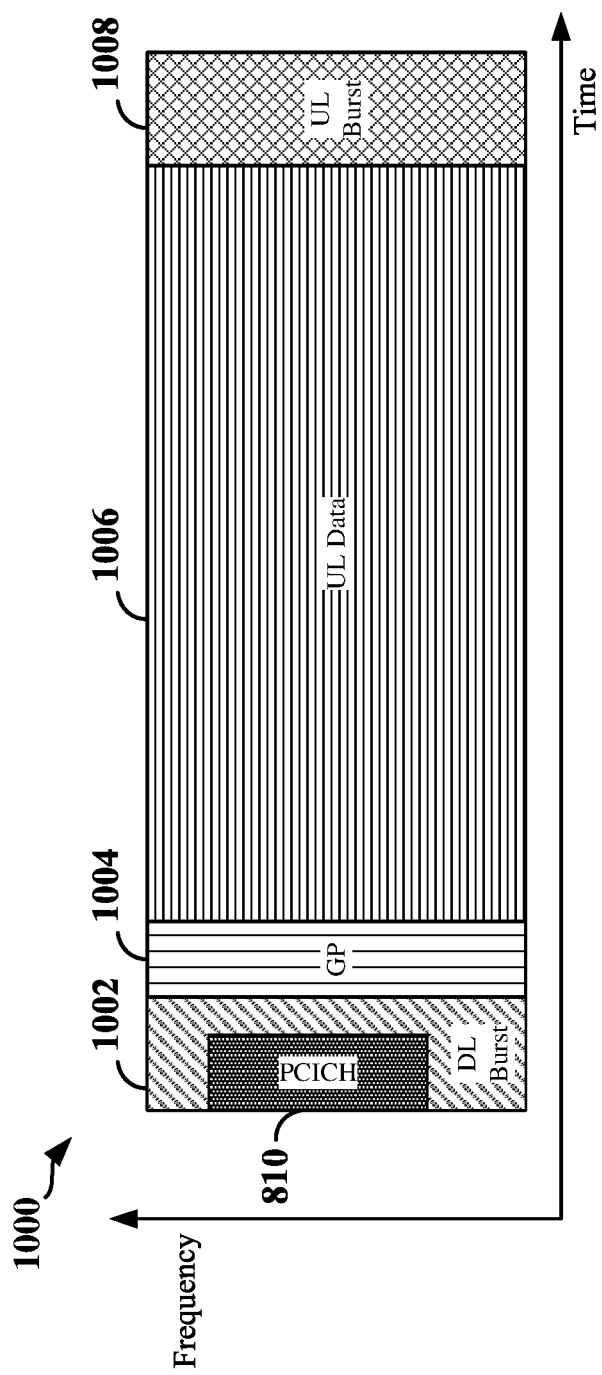
FIG. 10 illustrates a structure of an uplink-centric slot including the PCICH according to some embodiments.

FIG. 10 illustrates a structure of an uplink-centric (UL-centric) slot 1000 including the PCICH according to some embodiments. The UL-centric slot is referred to as a UL-centric slot because a majority (or, in some examples, a substantial portion) of the slot includes UL user data traffic. In the example shown in FIG. 10, time is illustrated along a horizontal axis, while frequency is illustrated along a vertical axis. The time-frequency resources of the UL-centric slot 1000 may be divided into a DL common burst 1002, an UL data portion 1006 and an UL common burst 1008.

The DL common burst 1002 may exist in the initial or beginning portion of the UL-centric slot. The DL common burst 1002 in FIG. 10 may be similar to the DL common burst 802 described above with reference to FIG. 8. The UL-centric slot may also include an UL data portion 1006. The UL data portion 1006 may sometimes be referred to as the payload of the UL-centric slot. The UL data portion 1006 may include the communication resources utilized to communicate UL user data traffic from the UE to the base station. In some configurations, the UL data portion 1006 may be a physical UL shared channel (PUSCH). As illustrated in FIG. 10, the end of the DL common burst 1002 may be separated in time from the beginning of the UL data portion 1006. This time, separation may sometimes be referred to as a gap, guard period, guard interval, and/or various other suitable terms, hereinafter referred to as a guard period (GP) 1004. This separation provides time for the switch-over from DL communication (e.g., reception operation by the UE) to UL communication (e.g., transmission by the UE).

The UL common burst 1008 in FIG. 10 may be similar to the UL common burst 808 described above with reference to FIG. 8. The UL common burst 1008 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

In accordance with various aspects of the present disclosure, the DL common burst 1002 may further be used to transmit the PCICH 810. Similar to the above example of FIG. 8, in the examples of FIGS. 9 and 10, the location of the PCICH, and the number of PCICH transmissions in a given DL common burst 802 may be selected for a given implementation, and the illustrated examples of FIGS. 9 and 10 is not intended to be limiting.

In some examples, the PCICH 810 may be carried within both DL-centric slots (e.g., as shown in FIG. 8 or 9) and UL-centric slots. For example, the PCICH 810 may be transmitted across two or more DL-centric slots, two or more UL-centric slots or a combination of DL-centric and UL-centric slots. The PCICH 810 may also be repeated within both DL-centric and UL-centric slots. For example, the PCICH may initially be carried within a DL-centric slot or UL-centric slot and then repeated (retransmitted) in one or more additional DL-centric slots and/or UL-centric slots to increase the likelihood that the UE correctly receives the PCICH. In addition, the UE may transmit an ACK/NACK signal to the BS in the UL common burst of a DL-centric slot or UL-centric slot to indicate whether the PCICH was correctly received. Retransmissions of the PCICH may therefore be determined based on the ACK/NACK signal (e.g., if a NACK is received, the BS may schedule a retransmission of the PCICH).

Figure 11:
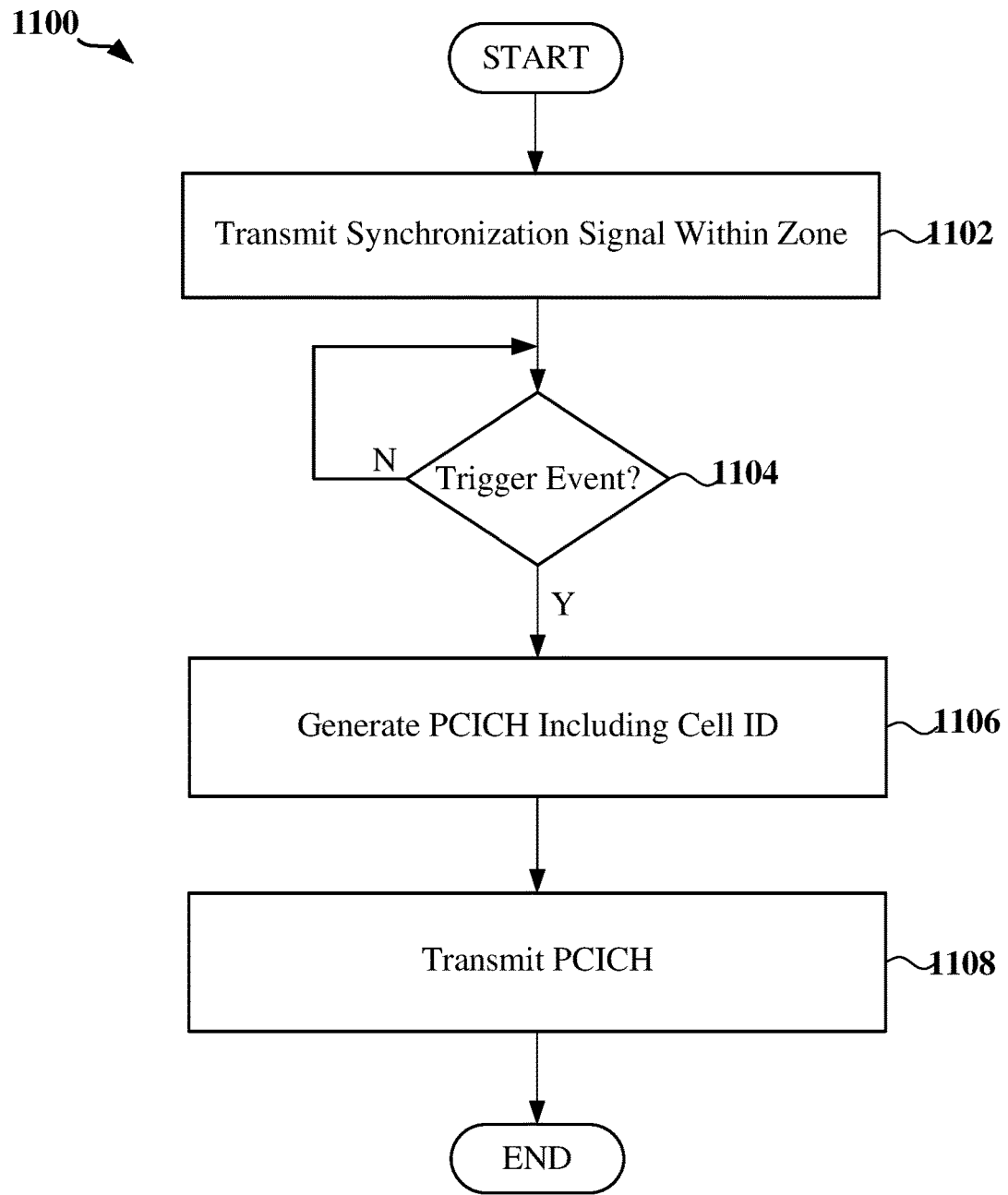
FIG. 11 is a flow chart of a method of providing a cell identifier in a wireless communication network according to some embodiments.

FIG. 11 is a flow chart illustrating an exemplary process 1100 for providing a cell identifier in a wireless communication network according to some embodiments. As described below, some or all illustrated features may be omitted in a particular implementation within the scope of the present disclosure, and some illustrated features may not be required for implementation of all embodiments. In some examples, the process 1100 may be carried out by the base station illustrated in FIG. 3. In some examples, the process 1100 may be carried out by any suitable apparatus or means for carrying out the functions or algorithm described below.

At block 1102, the base station (BS) may transmit unified synchronization signals within a zone associated with the base station. A UE may then utilize the unified synchronization signals to synchronize with the zone. For example, the DL traffic and control channel generation and transmission circuitry 342 shown and described above in reference to FIG. 3 may transmit the unified synchronization signals.

At block 1104, the BS may determine whether a trigger event requiring the UE to have knowledge of the cell identifier of the cell served by the BS has occurred. For example, the BS may determine whether the BS has received downlink user data traffic for transmission to the UE, whether the BS has received a system information request from the UE or whether the BS has received a random access request from the UE. For example, the PCICH trigger detection circuitry 344 shown and described above in reference to FIG. 3 may determine whether a trigger event has occurred.

If a trigger event has occurred (Y branch of 1104), at block 1106, the BS may generate a Physical Cell Identification Channel (PCICH) including the cell identifier, and at block 1108, transmit the PCICH to the UE. For example, the PCICH generation circuitry 345 shown and described above in reference to FIG. 3 may generate the PCICH and the DL traffic and control channel generation and transmission circuitry 342 shown and described above in reference to FIG. 3 may transmit the PCICH to the UE.

Figure 12:
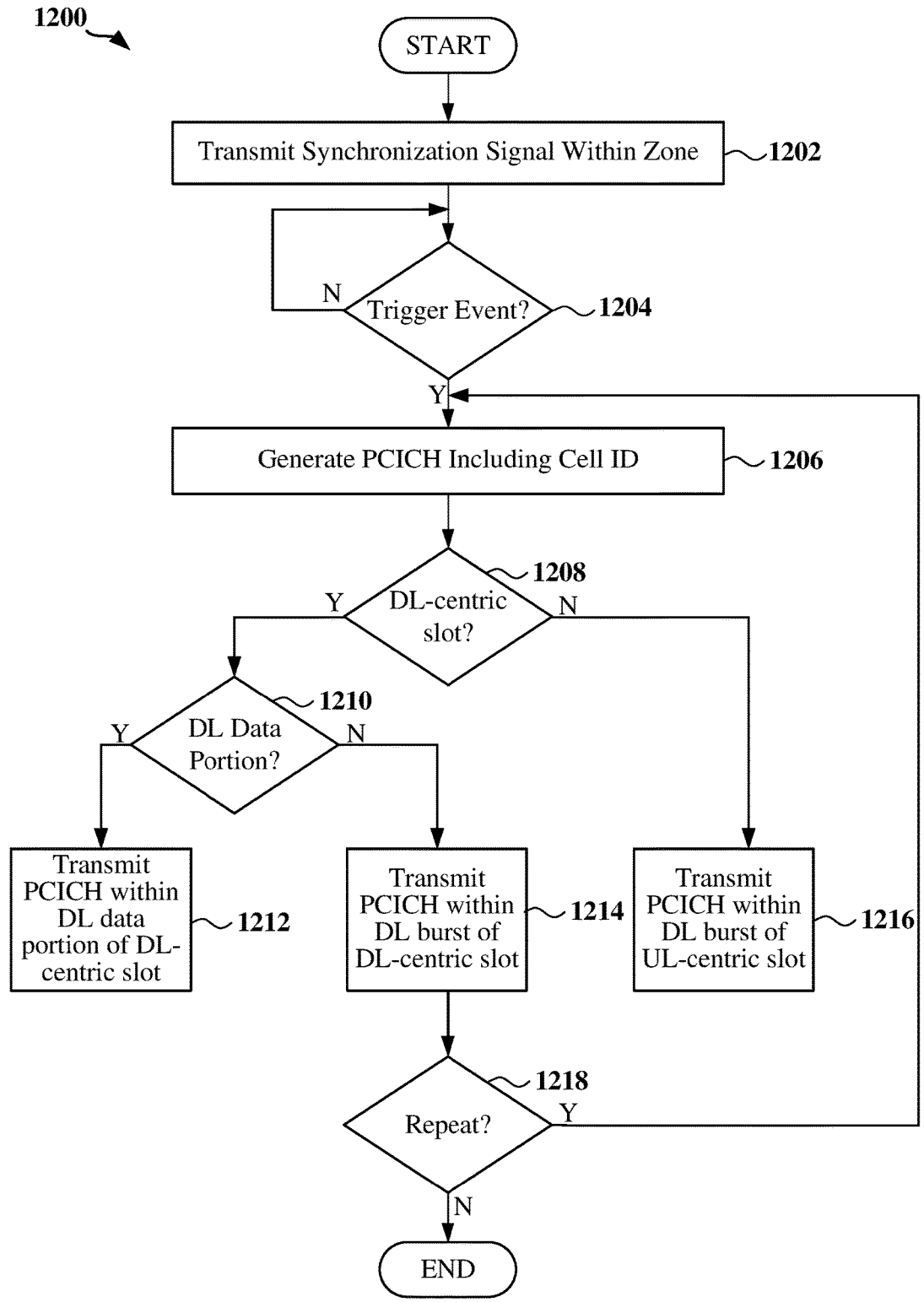
FIG. 12 is a flow chart of another method of providing a cell identifier in a wireless communication network according to some embodiments.

FIG. 12 is a flow chart illustrating an exemplary process 1200 for providing a cell identifier in a wireless communication network according to some embodiments. As described below, some or all illustrated features may be omitted in a particular implementation within the scope of the present disclosure, and some illustrated features may not be required for implementation of all embodiments. In some examples, the process 1200 may be carried out by the base station illustrated in FIG. 3. In some examples, the process 1200 may be carried out by any suitable apparatus or means for carrying out the functions or algorithm described below.

At block 1202, the base station (BS) may transmit unified synchronization signals within a zone associated with the base station. A UE may then utilize the unified synchronization signals to synchronize with the zone. For example, the DL traffic and control channel generation and transmission circuitry 342 shown and described above in reference to FIG. 3 may transmit the unified synchronization signals.

At block 1204, the BS may determine whether a trigger event requiring the UE to have knowledge of the cell identifier of the cell served by the BS has occurred. For example, the BS may determine whether the BS has received downlink user data traffic for transmission to the UE, whether the BS has received a system information request from the UE or whether the BS has received a random access request from the UE. For example, the PCICH trigger detection circuitry 344 shown and described above in reference to FIG. 3 may determine whether a trigger event has occurred.

If a trigger event has occurred (Y branch of 1204), at block 1206, the BS may generate a Physical Cell Identification Channel (PCICH) including the cell identifier. For example, the PCICH generation circuitry 345 shown and described above in reference to FIG. 3 may generate the PCICH.

At block 1208, the base station may determine whether to transmit the PCICH to the UE within a DL-centric slot or an UL-centric slot. In some examples, the base station may determine whether the next slot to be transmitted is a DL-centric slot or an UL-centric slot and may include the PCICH within the next slot accordingly. In other examples, the base station may transmit the PCICH within only a DL-centric slot or an UL-centric slot. For example, the resource assignment and scheduling circuitry 341 shown and described above in reference to FIG. 3 may determine whether to include the PCICH within a DL-centric slot or an UL-centric slot.

If the PCICH is to be included in a DL-centric slot (Y branch of block 1208), at block 1210, the base station may determine whether to include the PCICH within a DL data portion, as shown in FIG. 8, or a DL common burst, as shown in FIG. 9, of the DL-centric slot. If the base station determines to include the PCICH in the DL data portion of the DL-centric slot (Y branch of block 1210), at block 1212, the base station schedules resources within the DL data portion of the DL-centric slot for the PCICH and transmits the PCICH to the UE within the DL data portion of the DL-centric slot using the scheduled resources. If the base station determines to include the PCICH in the DL common burst of the DL-centric slot (N branch of block 1210), at block 1214, the base station schedules resources within the DL common burst of the DL-centric slot for the PCICH and transmits the PCICH to the UE within the DL common burst of the DL-centric slot using the scheduled resources. For example, the resource assignment and scheduling circuitry 341 and DL traffic and control channel generation and transmission circuitry 342 shown and described above in reference to FIG. 3 may determine whether to include the PCICH in the DL data portion or DL common burst of the DL-centric slot, schedule resources accordingly, and transmit the PCICH over the scheduled resources.

If the PCICH is to be included in an UL-centric slot (N branch of block 1208), at block 1216, the base station schedules resources within a DL common burst of the UL-centric slot for the PCICH and transmits the PCICH to the UE within the DL common burst of the UL-centric slot using the scheduled resources. For example, the resource assignment and scheduling circuitry 341 and DL traffic and control channel generation and transmission circuitry 342 shown and described above in reference to FIG. 3 may schedule resources within the DL common burst of the UL-centric slot, and transmit the PCICH over the scheduled resources.

At block 1218, the base station determines whether to repeat transmission of the PCICH to the UE within an additional symbol of the same slot or within an additional slot. If the PCICH is to be repeated (Y branch of block 1218), the process returns to block 1206, where the base station generates the PCICH for transmission to the UE. For example, the PCICH generation circuitry 345 shown and described above in reference to FIG. 3 may determine whether to repeat transmission of the PCICH.

Figure 13:
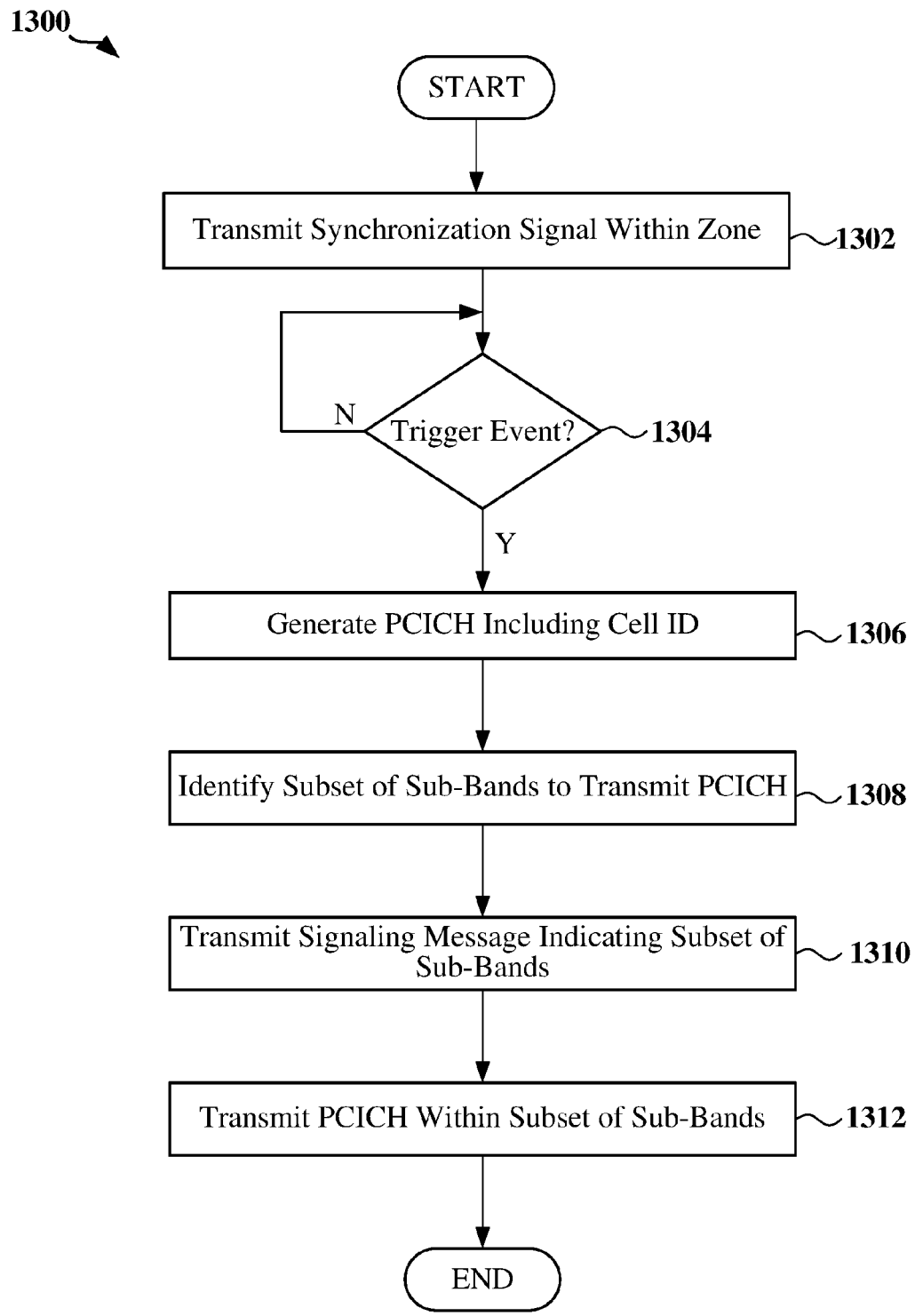
FIG. 13 is a flow chart of another method of providing a cell identifier in a wireless communication network according to some embodiments.

FIG. 13 is a flow chart illustrating an exemplary process 1300 for providing a cell identifier in a wireless communication network according to some embodiments. As described below, some or all illustrated features may be omitted in a particular implementation within the scope of the present disclosure, and some illustrated features may not be required for implementation of all embodiments. In some examples, the process 1300 may be carried out by the base station illustrated in FIG. 3. In some examples, the process 1300 may be carried out by any suitable apparatus or means for carrying out the functions or algorithm described below.

At block 1302, the base station (BS) may transmit unified synchronization signals within a zone associated with the base station. A UE may then utilize the unified synchronization signals to synchronize with the zone. For example, the DL traffic and control channel generation and transmission circuitry 342 shown and described above in reference to FIG. 3 may transmit the unified synchronization signals.

At block 1304, the BS may determine whether a trigger event requiring the UE to have knowledge of the cell identifier of the cell served by the BS has occurred. For example, the BS may determine whether the BS has received downlink user data traffic for transmission to the UE, whether the BS has received a system information request from the UE or whether the BS has received a random access request from the UE. For example, the PCICH trigger detection circuitry 344 shown and described above in reference to FIG. 3 may determine whether a trigger event has occurred.

If a trigger event has occurred (Y branch of 1304), at block 1306, the BS may generate a Physical Cell Identification Channel (PCICH) including the cell identifier. For example, the PCICH generation circuitry 345 shown and described above in reference to FIG. 3 may generate the PCICH.

At block 1308, the base station may identify a subset of a plurality of sub-bands for transmission of the PCICH to the UE. For example, the downlink bandwidth may be divided into a plurality of sub-bands, where each sub-band includes a set of contiguous time-frequency resources. In some examples, a UE may have access to only part of the system downlink bandwidth due to hardware constraints and/or power savings requirements of the UE. In this example, the base station may identify the subset of the plurality of sub-bands that the UE has access to. For example, the resource assignment and scheduling circuitry 341 shown and described above in reference to FIG. 3 may identify the subset of sub-bands for transmission of the PCICH to the UE.

At block 1310, the base station may generate and transmit a signaling message indicating the subset of sub-bands including the PCICH. In some examples, the signaling message includes a master information block (MIB) transmitted over a unified physical broadcast channel (PBCH). For example, the resource assignment and scheduling circuitry 341 and DL traffic and control channel generation and transmission circuitry 342 shown and described above in reference to FIG. 3 may transmit the signaling message to the UE. At block 1312, the base station may then transmit the PCICH to the UE. For example, the DL traffic and control channel generation and transmission circuitry 342 shown and described above in reference to FIG. 3 may transmit the PCICH to the UE.

Figure 14:
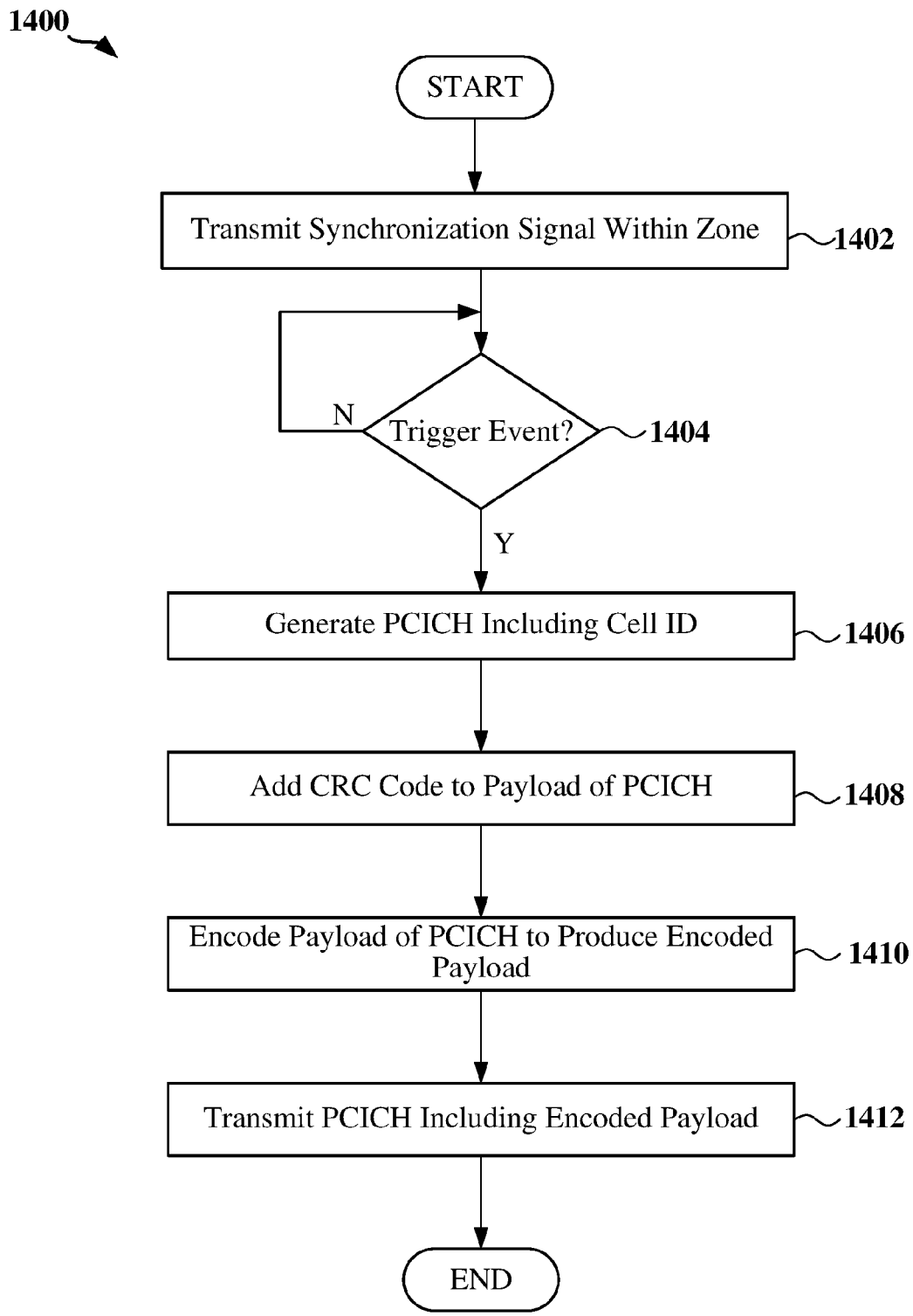
FIG. 14 is a flow chart of another method of providing a cell identifier in a wireless communication network according to some embodiments.

FIG. 14 is a flow chart illustrating an exemplary process 1400 for providing a cell identifier in a wireless communication network according to some embodiments. As described below, some or all illustrated features may be omitted in a particular implementation within the scope of the present disclosure, and some illustrated features may not be required for implementation of all embodiments. In some examples, the process 1400 may be carried out by the base station illustrated in FIG. 3. In some examples, the process 1400 may be carried out by any suitable apparatus or means for carrying out the functions or algorithm described below.

At block 1402, the base station (BS) may transmit unified synchronization signals within a zone associated with the base station. A UE may then utilize the unified synchronization signals to synchronize with the zone. For example, the DL traffic and control channel generation and transmission circuitry 342 shown and described above in reference to FIG. 3 may transmit the unified synchronization signals.

At block 1404, the BS may determine whether a trigger event requiring the UE to have knowledge of the cell identifier of the cell served by the BS has occurred. For example, the BS may determine whether the BS has received downlink user data traffic for transmission to the UE, whether the BS has received a system information request from the UE or whether the BS has received a random access request from the UE. For example, the PCICH trigger detection circuitry 344 shown and described above in reference to FIG. 3 may determine whether a trigger event has occurred.

If a trigger event has occurred (Y branch of 1404), at block 1406, the BS may generate a Physical Cell Identification Channel (PCICH) including the cell identifier. For example, the PCICH generation circuitry 345 shown and described above in reference to FIG. 3 may generate the PCICH.

At block 1408, the base station may add a cyclic redundancy check (CRC) code to a payload of the PCICH, and at block 1410, the base station may encode the payload of the PCICH to produce an encoded payload. For example, the DL traffic and control channel generation and transmission circuitry 342 shown and described above in reference to FIG. 3 may add the CRC code to the PCICH payload and encode the PCICH payload to produce the encoded payload. At block 1412, the base station may then transmit the PCICH including the encoded payload to the UE. For example, the DL traffic and control channel generation and transmission circuitry 342 shown and described above in reference to FIG. 3 may transmit the PCICH to the UE.

Figure 15:
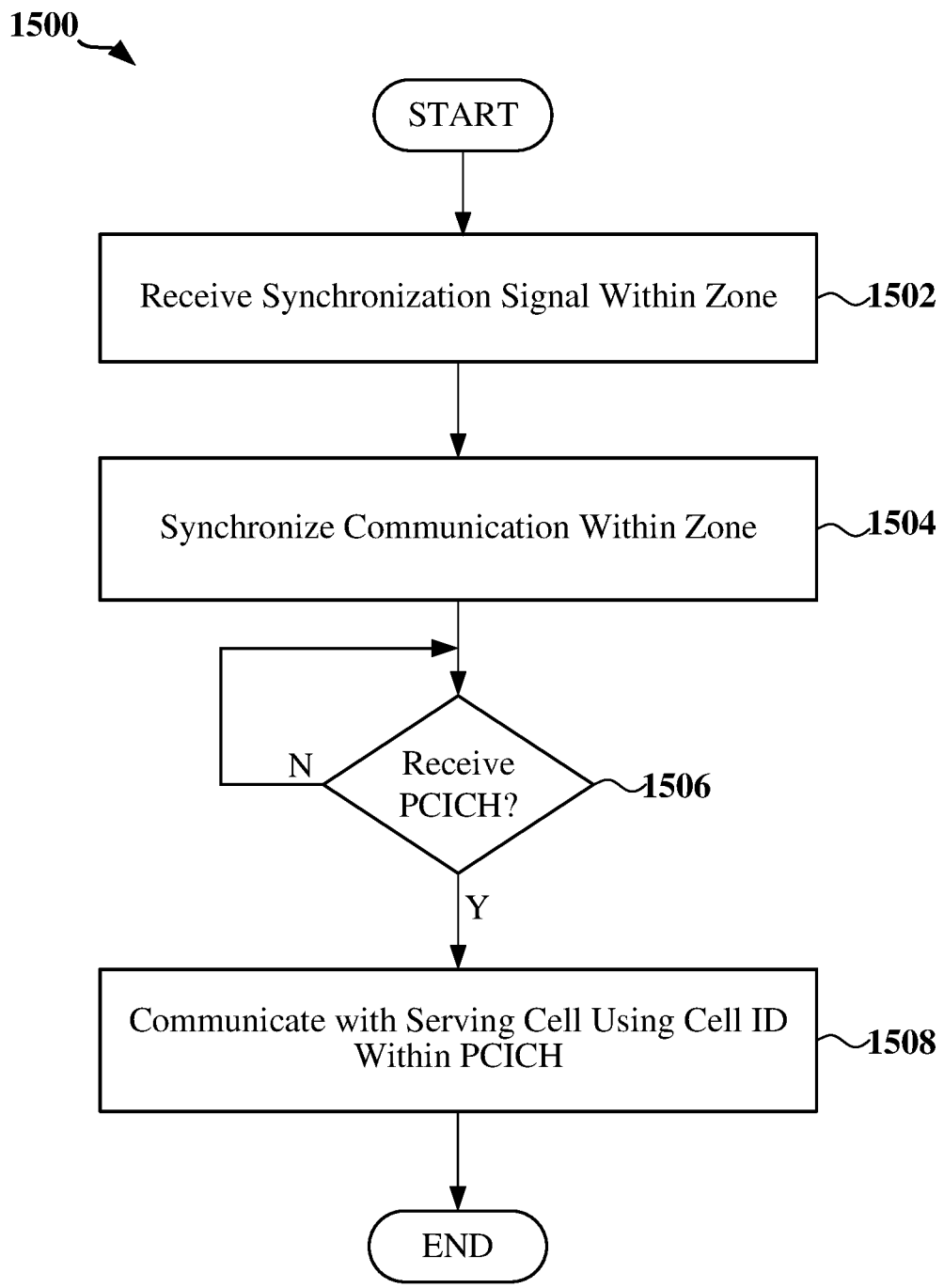
FIG. 15 is a flow chart of a method of receiving a cell identifier in a wireless communication network according to some embodiments.

FIG. 15 is a flow chart illustrating an exemplary process 1500 for receiving a cell identifier in a wireless communication network according to some embodiments. As described below, some or all illustrated features may be omitted in a particular implementation within the scope of the present disclosure, and some illustrated features may not be required for implementation of all embodiments. In some examples, the process 1500 may be carried out by the user equipment illustrated in FIG. 4. In some examples, the process 1500 may be carried out by any suitable apparatus or means for carrying out the functions or algorithm described below.

At block 1502, the user equipment (UE) may receive unified synchronization signals within a zone associated with a serving base station (BS). At block 1504, the UE may then utilize the unified synchronization signals to synchronize with the zone. For example, the DL traffic and control channel reception and processing circuitry 444 shown and described above in reference to FIG. 4 may receive the unified synchronization signals and synchronize with the zone.

At block 1506, the UE may determine whether the UE has received a Physical Cell Identification Channel (PCICH) including the cell identifier of the serving cell. For example, the PCICH may be received in response to the BS detecting the presence of downlink user data traffic for transmission to the UE, the UE transmitting a system information request to the BS or the UE transmitting a random access request to the BS. For example, the PCICH reception and processing circuitry 443 shown and described above in reference to FIG. 4 may determine whether the PCICH has been received.

If the PCICH was received (Y branch of 1506), at block 1508, the UE may utilize the cell identifier within the PCICH to communicate with the serving cell (e.g., serving BS). For example, the UE may utilize the cell identifier to demodulate signals (e.g., PDCCH and/or PDSCH) received from the BS. For example, the PCICH reception and processing circuitry 443 shown and described above in reference to FIG. 4 may process the PCICH to obtain the cell identifier and provide the cell identifier to the DL traffic and control channel reception and processing circuitry 444 shown and described above in reference to FIG. 4 to process signals received from the BS.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network, the method comprising:
   transmitting a synchronization signal within a zone comprising a plurality of cells to enable a user equipment to synchronize with the zone;
   communicating with the user equipment using a zone identifier of the zone without providing a cell identifier of a serving cell within the zone;
   detecting a trigger event that necessitates the user equipment have knowledge of the cell identifier of the serving cell for communication between the user equipment and the serving cell within the zone;
   transmitting a physical cell identification channel (PCICH) to the user equipment in response to the trigger event, the PCICH carrying a single cell identifier corresponding to the cell identifier of the serving cell.

2. The method of claim 1, wherein transmitting the PCICH further comprises:
   transmitting the PCICH within a downlink-centric slot comprising at least a downlink common burst and a downlink data portion.

3. The method of claim 2, wherein transmitting the PCICH further comprises:
   transmitting the PCICH within one of the downlink data portion or the downlink common burst of the downlink-centric slot.

4. The method of claim 1, wherein transmitting the PCICH further comprises:
   transmitting the PCICH within an uplink-centric slot comprising at least a downlink common burst and an uplink data portion;
   wherein the PCICH is included within the downlink common burst.

5. The method of claim 1, wherein transmitting the PCICH further comprises:
   transmitting the PCICH over two or more slots.

6. The method of claim 1, wherein transmitting the PCICH further comprises:
   dividing a downlink bandwidth into a plurality of sub-bands;
   transmitting the PCICH within a subset of the plurality of sub-bands; and
   transmitting a signaling message indicating the subset of the plurality of sub-bands comprising the PCICH.

7. The method of claim 1, further comprising:
   adding a cyclic redundancy check (CRC) code to a payload of the PCICH; and
   encoding the payload comprising the CRC code to produce an encoded payload.

8. The method of claim 1, further comprising:
   repeating transmission of the PCICH over one or more symbols of a slot or over one or more slots.

9. The method of claim 1, wherein transmitting the PCICH further comprises:
   multiplexing the PCICH with one or more additional PCICHs, wherein each of the one or more additional PCICHs is associated with one or more respective additional user equipment.

10. The method of claim 1, wherein detecting the trigger event further comprises:
    detecting the presence of user data traffic to be transmitted to the user equipment; and
    transmitting a paging message to the user equipment indicating the presence of user data traffic to be transmitted to the user equipment.

11. The method of claim 1, wherein detecting the trigger event further comprises:
    receiving a random access request from the user equipment indicating the user equipment has user data traffic to transmit.

12. The method of claim 11, further comprising:
    transmitting a random access response to the user equipment in response to the random access request and subsequent to transmission of the PCICH, wherein the random access response is scrambled using the cell identifier.

13. The method of claim 1, wherein detecting the trigger event further comprises:
    receiving an on-demand system information request from the user equipment.

14. The method of claim 13, further comprising:
    transmitting a system information response to the user equipment in response to the on-demand system information request and subsequent to transmission of the PCICH, wherein the system information response is scrambled using the cell identifier.

15. An apparatus in a wireless communication network, comprising:
    a processor;
    a transceiver communicatively coupled to the processor; and
    a memory communicatively coupled to the processor, wherein the processor is configured to:
      transmit a synchronization signal within a zone comprising a plurality of cells to enable a user equipment to synchronize with the zone;
      communicate with the user equipment using a zone identifier of the zone without providing a cell identifier of a serving cell within the zone;
      detect a trigger event that necessitates the user equipment to have knowledge of the cell identifier of the serving cell for communication between the user equipment and the serving cell within the zone;
      transmit a physical cell identification channel (PCICH) to the user equipment in response to the trigger event, the PCICH carrying a single cell identifier corresponding to the cell identifier of the serving cell.

16. The apparatus of claim 15, wherein the processor is further configured to:
    transmit the PCICH within a downlink-centric slot comprising at least a downlink common burst and a downlink data portion;
    wherein the PCICH is transmitted within one of the downlink data portion or the downlink common burst of the downlink-centric slot.

17. The apparatus of claim 15, wherein the processor is further configured to:
    transmit the PCICH within an uplink-centric slot comprising at least a downlink common burst and an uplink data portion;
    wherein the PCICH is included within the downlink common burst.

18. The apparatus of claim 15, wherein the processor is further configured to:
    detect the presence of user data traffic to be transmitted to the user equipment, wherein the presence of user data traffic comprises the trigger event; and
    transmit a paging message to the user equipment indicating the presence of user data traffic to be transmitted to the user equipment.

19. The apparatus of claim 15, wherein the processor is further configured to:
receive a random access request from the user equipment indicating the user equipment has user data traffic to transmit, wherein the random access request comprises the trigger event; and
transmit a random access response to the user equipment in response to the random access request and subsequent to transmission of the PCICH, wherein the random access response is scrambled using the cell identifier.

20. The apparatus of claim 15, wherein the processor is further configured to:
receive an on-demand system information request from the user equipment, wherein the on-demand system information request comprises the trigger event; and
transmitting a system information response to the user equipment in response to the on-demand system information request and subsequent to transmission of the PCICH, wherein the system information response is scrambled using the cell identifier.

21. A method of wireless communication in a wireless communication network, the method comprising:
receiving a synchronization signal within a zone comprising a plurality of cells;
synchronizing with the zone utilizing the synchronization signal;
communicating with a serving cell within the zone using a zone identifier of the zone without receiving a cell identifier of the serving cell;
upon occurrence of a trigger event, receiving a physical cell identification channel (PCICH) carrying a single cell identifier corresponding to the cell identifier of the serving cell within the zone; and
communicating with the serving cell utilizing the cell identifier.

22. The method of claim 21, wherein communicating with the serving cell further comprises:
receiving a paging message indicating the presence of user data traffic to be transmitted, wherein the presence of user data traffic comprises the trigger event;
receiving a communication related to the user data traffic; and
processing the communication utilizing the cell identifier.

23. The method of claim 21, wherein communicating with the serving cell further comprises:
receiving a random access response signal in response to transmitting a random access request, wherein the random access request comprises the trigger event; and
demodulating the random access response signal utilizing the cell identifier.

24. The method of claim 21, wherein communicating with the serving cell further comprises:
receiving a system information response signal in response to transmitting an on-demand system information request, wherein the on-demand system information request comprises the trigger event; and
demodulating the system information response signal utilizing the cell identifier.

25. The method of claim 21, wherein receiving the PCICH further comprises:
receiving the PCICH within a subset of a plurality of sub-bands of a downlink bandwidth.

26. An apparatus in a wireless communication network, comprising:
a processor;
a transceiver communicatively coupled to the processor; and
a memory communicatively coupled to the processor, wherein the processor is configured to:
receive a synchronization signal within a zone comprising a plurality of cells;
synchronize with the zone utilizing the synchronization signal;
communicate with a serving cell within the zone using a zone identifier of the zone without receiving a cell identifier of the serving cell;
upon occurrence of a trigger event, receive a physical cell identification channel (PCICH) carrying a single cell identifier corresponding to the cell identifier of the serving cell within the zone; and
communicate with the serving cell utilizing the cell identifier.

27. The apparatus of claim 26, wherein the processor is further configured to:
receive a paging message indicating the presence of user data traffic to be transmitted, wherein the presence of user data traffic comprises the trigger event;
receive a communication related to the user data traffic; and
process the communication utilizing the cell identifier.

28. The apparatus of claim 26, wherein the processor is further configured to:
receive a random access response signal in response to transmitting a random access request, wherein the random access request comprises the trigger event; and
demodulate the random access response signal utilizing the cell identifier.

29. The apparatus of claim 26, wherein the processor is further configured to:
receive a system information response signal in response to transmitting an on-demand system information request, wherein the on-demand system information request comprises the trigger event; and
demodulate the system information response signal utilizing the cell identifier.

30. The apparatus of claim 26, wherein the processor is further configured to:
receive the PCICH within a subset of a plurality of sub-bands of a downlink bandwidth.

* * * * *